(12) United States Patent
Masamura

(10) Patent No.: US 10,183,540 B2
(45) Date of Patent: Jan. 22, 2019

(54) SUSPENSION DEVICE AND SUSPENSION CONTROL UNIT

(71) Applicant: KYB Corporation, Tokyo (JP)

(72) Inventor: Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/524,903

(22) PCT Filed: Nov. 6, 2015

(86) PCT No.: PCT/JP2015/081392
§ 371 (c)(1),
(2) Date: May 5, 2017

(87) PCT Pub. No.: WO2016/072512
PCT Pub. Date: May 12, 2016

(65) Prior Publication Data
US 2017/0320368 A1 Nov. 9, 2017

(30) Foreign Application Priority Data
Nov. 7, 2014 (JP) ................................. 2014-226736

(51) Int. Cl.
*B60G 21/06* (2006.01)
*B60G 17/015* (2006.01)
(Continued)

(52) U.S. Cl.
CPC ......... *B60G 17/015* (2013.01); *B60G 17/017* (2013.01); *B60G 17/018* (2013.01); *B60G 17/0165* (2013.01); *B60G 17/056* (2013.01);
*B60G 17/08* (2013.01); *B60G 2202/413* (2013.01); *B60G 2202/414* (2013.01); *B60G 2202/416* (2013.01); *B60G 2300/50* (2013.01); *B60G 2400/104* (2013.01); *B60G 2400/106* (2013.01); *B60G 2400/204* (2013.01);
(Continued)

(58) Field of Classification Search
CPC .......................... B60G 17/015; B60G 17/056
USPC ...... 280/124.157, 124.158, 124.16, 124.161; 701/37, 48
See application file for complete search history.

(56) References Cited

U.S. PATENT DOCUMENTS

| 4,911,468 A | 3/1990 | Fukunaga |
| 5,062,659 A * | 11/1991 | Edahiro ............... B60G 17/015 188/266.5 |

(Continued)

FOREIGN PATENT DOCUMENTS

| JP | S63-176710 A | 7/1988 |
| JP | H01-249509 A | 10/1989 |

(Continued)

*Primary Examiner* — Toan C To
(74) *Attorney, Agent, or Firm* — Rabin & Berdo, P.C.

(57) ABSTRACT

A suspension device includes an actuator device provided with an extensible/contractible actuator body interposed between a sprung member and an unsprung member of a vehicle, a pump that supplies fluid to the actuator body to extend or contract the actuator body, and a controller that controls a rotation number of the pump. The controller has a road surface state index obtainment unit that obtains a road surface state index and a target rotation number determination unit that determines a target rotation number of the pump on the basis of the road surface state index.

8 Claims, 13 Drawing Sheets

(51) Int. Cl.
*B60G 17/056* (2006.01)
*B60G 17/0165* (2006.01)
*B60G 17/017* (2006.01)
*B60G 17/018* (2006.01)
*B60G 17/08* (2006.01)

(52) U.S. Cl.
CPC .... *B60G 2400/821* (2013.01); *B60G 2500/02* (2013.01); *B60G 2500/30* (2013.01); *B60G 2600/07* (2013.01); *B60G 2800/9123* (2013.01)

(56) References Cited

U.S. PATENT DOCUMENTS

| | | | | |
|---|---|---|---|---|
| 6,161,845 | A * | 12/2000 | Shono | B60G 17/0152 280/5.514 |
| 6,202,010 | B1 * | 3/2001 | Shono | B60G 17/017 180/41 |
| 6,240,348 | B1 * | 5/2001 | Shono | B60G 17/017 280/124.159 |
| 6,266,602 | B1 * | 7/2001 | Yamaura | B60T 8/172 303/112 |
| 6,282,470 | B1 * | 8/2001 | Shono | B60G 17/015 180/41 |
| 2011/0187065 | A1 | 8/2011 | Van Der Knaap et al. | |
| 2015/0032332 | A1 * | 1/2015 | Kikuchi | B60W 10/22 701/37 |
| 2015/0224845 | A1 * | 8/2015 | Anderson | B60G 17/019 701/37 |
| 2016/0023711 | A1 * | 1/2016 | Mochizuki | B60G 17/0272 280/6.157 |
| 2017/0305226 | A1 * | 10/2017 | Okimura | B60G 17/0416 |

FOREIGN PATENT DOCUMENTS

| | | |
|---|---|---|
| JP | H03-08013 U | 1/1991 |
| JP | H05-065012 A | 3/1993 |
| JP | 3020656 B2 | 3/2000 |
| JP | 2005-193708 A | 7/2005 |
| JP | 2011-530451 A | 12/2011 |

* cited by examiner

SUSPENSION DEVICE AND SUSPENSION CONTROL UNIT

TECHNICAL FIELD

The present invention relates to a suspension device and a suspension control unit.

BACKGROUND ART

As a suspension device, for example, there is known a suspension device serving as an active suspension interposed between a vehicle chassis and a vehicle axle. JP 63-176710 A discloses an active suspension including an actuator having a cylinder, a piston movably inserted into the cylinder to partition a pressure chamber in the cylinder, and a rod connected to the piston, a hydraulic pump driven by a vehicle engine at all times, a hydraulic channel that connects the pressure chamber inside the cylinder and the hydraulic pump, a pressure control valve provided in the middle of the hydraulic channel to control a pressure of the pressure chamber, and a control unit for controlling the pressure control valve.

SUMMARY OF INVENTION

In a hybrid electric vehicle (HEV) having an engine stop mode, the hydraulic pump also stops along with the stop of the engine. Therefore, the suspension device is not mounted on the HEV as it is.

In this regard, it is conceived that the hydraulic pump is driven by power of the motor as a driving source of the HEV or electric vehicle (EV). However, the hydraulic pump that supplies a hydraulic fluid to the suspension device in the prior art is driven during the control ceaselessly. In addition, a discharge flow rate of the hydraulic pump is set such that the supplied hydraulic fluid does not suffer from shortage even when the actuator is extended or contracted with a large amplitude at a high speed, such as a rough road travel. For this reason, energy consumed by the hydraulic pump is very high. As a result, energy consumption increases, and this makes it difficult to apply to the HEV or EV.

The present invention provides a suspension device that can be mounted on the HEV or EV with less energy consumption.

According to one aspect of the present invention, a suspension device includes: an actuator device that includes an extensible/contractible actuator body interposed between a sprung member and an unsprung member of a vehicle, and a pump configured to supply a fluid to the actuator body to extend or contract the actuator body; and a controller configured to control a rotation number of the pump. The controller includes: a road surface state index obtainment unit configured to obtain a road surface state index as a measure of road surface roughness during a vehicle travel; and a target rotation number determination unit configured to determine a target rotation number of the pump on the basis of the road surface state index.

According to another aspect of the present invention, a suspension control unit for controlling a rotation number of a pump in an actuator device having an extensible/contractible actuator body interposed between a sprung member and an unsprung member of a vehicle and the pump configured to supply a fluid to the actuator body to extend or contract the actuator body, the suspension control unit includes: a road surface state index obtainment unit configured to obtain a road surface state index as a measure of road surface roughness during a vehicle travel; and a target rotation number determination unit configured to determine a target rotation number of the pump on the basis of the road surface state index.

DESCRIPTION OF EMBODIMENTS

Embodiments of the present invention will now be described with reference to the accompanying drawings.

Figure 1:
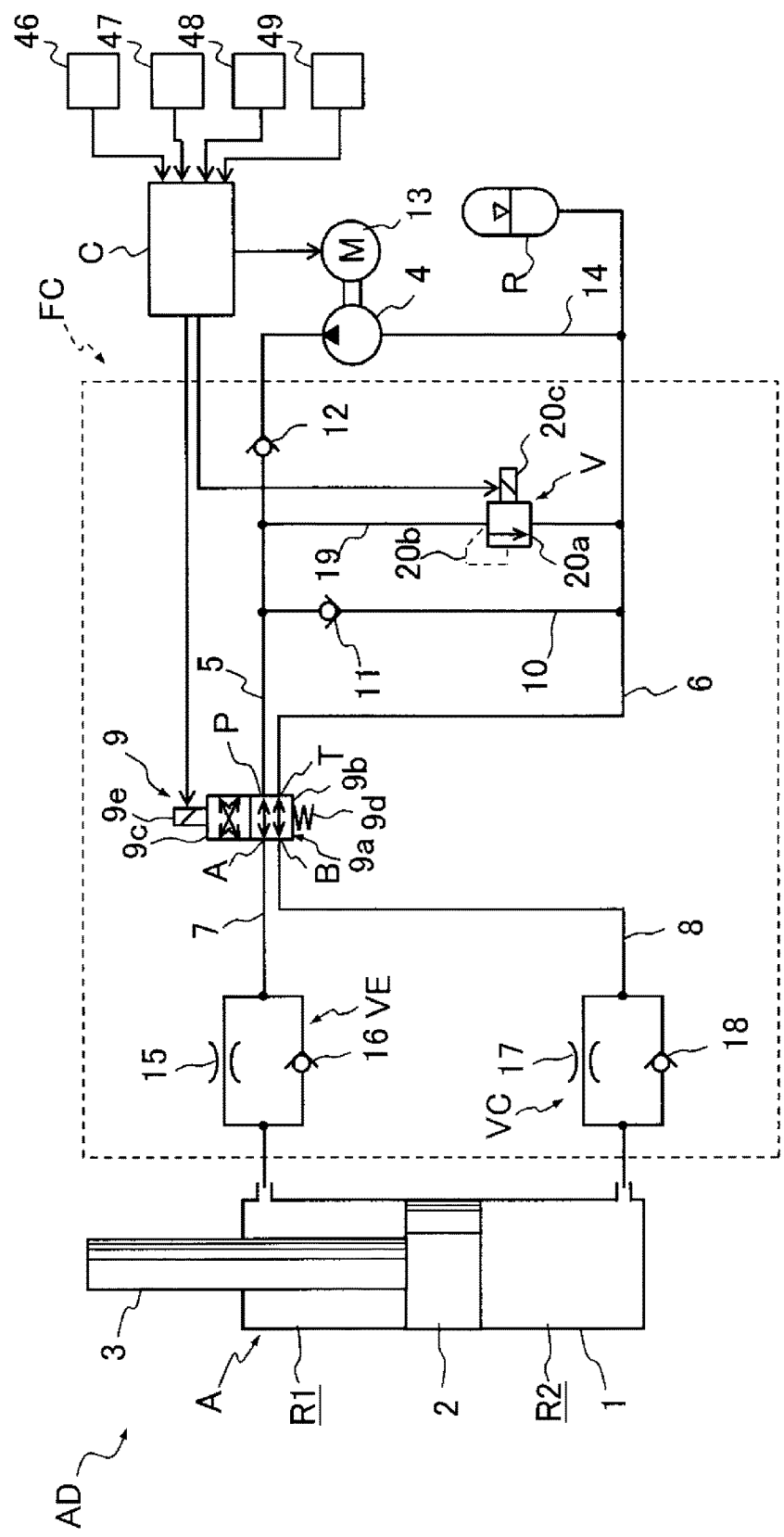
FIG. 1 is a diagram illustrating a suspension device according to an embodiment of the invention.

As illustrated in FIG. 1, the suspension device S according to an embodiment of the invention includes an actuator device AD, and a controller C as a suspension control unit for controlling the actuator device AD. The actuator device AD includes an extensible and contractible (extensible/contractible) actuator body A interposed between a sprung member B and an unsprung member W of a vehicle, a pump 4 driven rotatably to supply fluid to the actuator body A, a reservoir R connected to a suction side of the pump 4, and a hydraulic circuit FC provided between the actuator body A, and the pump 4 and the reservoir R.

The actuator body A includes a cylinder 1, a piston 2 movably inserted into the cylinder 1 to partition the cylinder 1 into an extension-side chamber R1 and a contraction-side chamber R2, and a rod 3 movably inserted into the cylinder 1 and connected to the piston 2. The actuator body A is a so-called single rod type in which the rod 3 is inserted into only the extension-side chamber R1. Note that the extension-side chamber R1 is a chamber compressed during an extension stroke, and the contraction-side chamber R2 is a chamber compressed during a contraction stroke.

The hydraulic circuit FC includes a supply channel 5 connected to a discharge side of the pump 4, a discharge channel 6 connected to the reservoir R, an extension-side passage 7 connected to the extension-side chamber R1, a contraction-side passage 8 connected to the contraction-side chamber R2, a direction switching valve 9 serving as a switching unit that selectively connects one of the extension-side passage 7 and the contraction-side passage 8 to the supply channel 5 and connects the other one of the extension-side passage 7 and the contraction-side passage 8 to the discharge channel 6, an extension-side damping element VE provided in the extension-side passage 7 to apply resistance to a flow directed from the extension-side chamber R1 to the direction switching valve 9 and allow the opposite flow, a contraction-side damping element VC provided in the contraction-side passage 8 to apply resistance to a flow directed from the contraction-side chamber R2 to the direction switching valve 9 and allows the opposite flow, a control valve V capable of adjusting a pressure of the supply channel 5 depending on a supplied electric current, a suction passage 10 that connects the supply channel 5 and the discharge channel 6, a suction check valve 11 provided in the middle of the suction passage 10 to allow only a flow of the fluid directed from the discharge channel 6 to the supply channel 5, and a supply-side check valve 12 provided between the control valve V and the pump 4 in the middle of the supply channel 5 to allow only a flow directed from the pump 4 side to the control valve V side.

As illustrated in FIG. 1, the reservoir R is provided independently from the actuator body A. Alternatively, an outer tube may be provided in an outer circumference side of the cylinder 1 of the actuator body A, and an annular space between the cylinder 1 and the outer tube may be used as a reservoir R.

Figure 2:
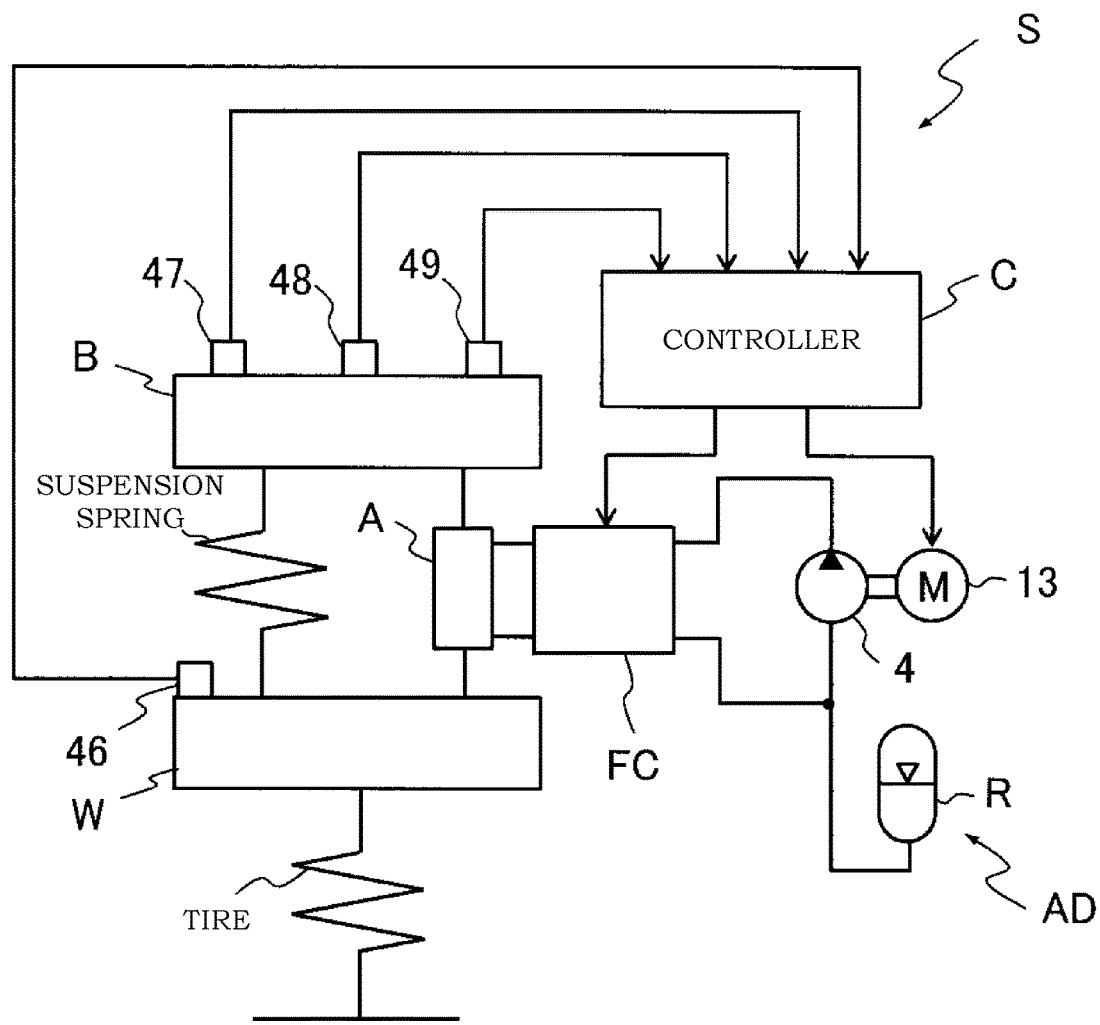
FIG. 2 is a diagram illustrating the suspension device interposed between a vehicle chassis and a vehicle wheel according to an embodiment of the invention.

When the actuator body A is installed in a vehicle, the actuator body A may be interposed between the sprung member B and the unsprung member W by connecting the cylinder 1 to one of the sprung member B and the unsprung member W of the vehicle, and connecting the rod 3 to the other one of the sprung member B and the unsprung member W as illustrated in FIG. 2.

As the fluid, for example, a liquid such as a hydraulic oil is filled in the extension-side chamber R1 and the contraction-side chamber R2, and a liquid and a gas are also filled in the reservoir R. The liquid filled in the extension-side chamber R1, the contraction-side chamber R2, and the reservoir R may include, for example, water, an aqueous solution, or the like as well as the hydraulic oil.

The pump 4 is driven by the motor 13, and is a unidirectional discharge type in which the fluid is suctioned in the suction side, and is discharged from the discharge side. Any type of the motor 13 may be employed, such as a brushless motor, an induction motor, or a synchronous motor, regardless of whether it is an AC or DC type.

The suction side of the pump 4 is connected to the reservoir R through a pump passage 14, and the discharge side is connected to the supply channel 5. Therefore, as the pump 4 is driven by the motor 13, the pump 4 suctions the fluid from the reservoir R and discharges the fluid to the supply channel 5.

The direction switching valve 9 as a switching unit is a 4-port 2-position electromagnetic switching valve. The direction switching valve 9 includes a valve body 9a, a spring 9d that biases the valve body 9a, and a solenoid 9e that exerts a thrust force opposite to the spring 9d to the valve body 9a. The valve body 9a has an extension-side supply position 9b where the ports A and P communicate with each other, and the ports B and T communicate with each other, and a contraction-side supply position 9c where the ports A and T communicate with each other, and the ports B and P communicate with each other. When no power is supplied to the solenoid 9e, the valve body 9a is biased by the spring 9d and has the extension-side supply position 9b. Meanwhile, when power is supplied to the solenoid 9e, the valve body 9a is driven by the thrust force of the solenoid 9e and has the contraction-side supply position 9c.

The port P of the direction switching valve 9 is connected to the discharge side of the pump 4 through the supply channel 5. The port T is connected to the reservoir R through the discharge channel 6. The port A is connected to the extension-side chamber R1 through the extension-side passage 7. The port B is connected to the contraction-side chamber R2 through the contraction-side passage 8.

Therefore, if the direction switching valve 9 is in the extension-side supply position 9b, the supply channel 5 communicates with the extension-side chamber R1 through the extension-side passage 7, and the discharge channel 6 communicates with the contraction-side chamber R2 through the contraction-side passage 8. If the pump 4 is driven in this state, the fluid is supplied to the extension-side chamber R1, and the fluid is discharged from the contraction-side chamber R2 to the reservoir R. As a result, the actuator body A is contracted. Meanwhile, if the direction switching valve 9 is in the contraction-side supply position 9c, the supply channel 5 communicates with the contraction-side chamber R2 through the contraction-side passage 8, and the discharge channel 6 communicates with the extension-side chamber R1 through the extension-side passage 7. If the pump 4 is driven in this state, the fluid is supplied to the contraction-side chamber R2, and the fluid is discharged from the extension-side chamber R1 to the reservoir R. As a result, the actuator body A is extended.

In the middle of the extension-side passage 7, an extension-side damping element VE is provided to apply resistance to a flow directed from the extension-side chamber R1 to the direction switching valve 9 and allow the opposite flow.

The extension-side damping element VE has a extension-side damping valve 15 that applies resistance to a flow directed from the extension-side chamber R1 to the direction switching valve 9, and an extension-side check valve 16 provided in parallel with the extension-side damping valve 15 to allow only a flow directed from the direction switching valve 9 to the extension-side chamber R1. Therefore, for a flow of the fluid moving from the extension-side chamber R1 to the direction switching valve 9, the extension-side check valve 16 is maintained in a closed state, so that the fluid flows to the direction switching valve 9 side only through the extension-side damping valve 15. On the contrary, for a flow of the fluid moving from the direction switching valve 9 to the extension-side chamber R1, the extension-side check valve 16 is opened, so that the extension-side check valve 16 applies smaller resistance to the flow, compared to the extension-side damping valve 15. Therefore, the fluid preferentially passes through the extension-side check valve 16 and flows to the extension-side chamber R1 side. The extension-side damping valve 15 may be a throttling valve that allows a bidirectional flow or a damping valve such as a leaf valve or a poppet valve that allows only a flow directed from the extension-side chamber R1 to the direction switching valve 9.

In the middle of the contraction-side passage 8, a contraction-side damping element VC is provided to apply resistance to a flow directed from the contraction-side chamber R2 to the direction switching valve 9 and allows the opposite flow.

The contraction-side damping element VC has a contraction-side damping valve 17 that applies resistance to a flow directed from the contraction-side chamber R2 to the direction switching valve 9, and a contraction-side check valve 18 provided in parallel with the contraction-side damping valve 17 to allow only a flow directed from the direction switching valve 9 to the contraction-side chamber R2. Therefore, for a flow of the fluid moving from the contraction-side chamber R2 to the direction switching valve 9, the contraction-side check valve 18 is maintained in a closed state, so that the fluid passes through only the contraction-side damping valve 17 and flows to the direction switching valve 9 side. On the contrary, for a flow of the fluid moving from the direction switching valve 9 to the contraction-side chamber R2, the contraction-side check valve 18 is opened, and the contraction-side check valve 18 applies smaller resistance to the flow, compared to the contraction-side damping valve 17, so that the fluid preferentially passes through the contraction-side check valve 18 and flows to the contraction-side chamber R2 side. The contraction-side damping valve 17 may be a throttling valve that allows a bidirectional flow or a damping valve such as leaf valve or a poppet valve that allows only a flow directed from the contraction-side chamber R2 to the direction switching valve 9.

In order to control a pressure of the fluid of the supply channel 5 discharged from the pump 4, the hydraulic circuit FC has a control valve V. The control valve V is provided in the middle of the control passage 19 that connects the supply channel 5 and the discharge channel 6. By adjusting a valve open pressure of the control valve V, the pressure of the supply channel 5 in the upstream side of the control valve V can be controlled.

The control valve V is an electromagnetic pressure control valve and includes a valve body 20a provided in the control passage 19, a pilot passage 20b that applies an upstream-side pressure in the supply channel 5 side to the valve body 20a as a pilot pressure in a valve open direction, and a solenoid 20c that applies a thrust force to the valve body 20a. The solenoid 20c has a spring and a coil (not shown). The spring of the solenoid 20c biases the valve body 20a in the valve open direction at all times. The solenoid 20c generates a thrust force for biasing the valve body 20a against the spring when it is electrically conducted. Therefore, the valve open pressure of the control valve V can be adjusted by adjusting an electric current amount applied to the solenoid 20c, so that the pressure of the supply channel 5 can be controlled to the valve open pressure of the control valve V. In this manner, the control valve V can control the pressure of the supply channel 5 depending on the supplied electric current. The control valve V may be any type of valves without limiting to the aforementioned configuration as long as the pressure of the supply channel 5 can be controlled.

The valve open pressure of the control valve V changes in proportion to the electric current amount supplied to the solenoid 20c. As the electric current amount increases, the valve open pressure increases. If no electric current is supplied, the valve open pressure is minimized. In addition, the control valve V has a characteristic having no pressure override in which a pressure loss increases in proportion to the flow rate in a practical area of the suspension devices S. Note that the "practical area" refers to, for example, an area where the actuator body A is extended or contracted within a range of a velocity of 1 m/sec when the actuator body A is interposed between the vehicle chassis B and the vehicle wheel W as illustrated in FIG. 2. In addition, the "characteristic having no pressure override in which a pressure loss increases in proportion to the flow rate" in this practical area means that the pressure override is negligible for the flow rate passing through the control valve V when the actuator body A is extended or contracted within a range of a velocity of 1 m/sec. Furthermore, the valve open pressure of the control valve V in a non-conduction state is very small, and nearly no resistance is applied to the flow of the fluid passing in the non-conduction state.

The suction passage 10 that connects the supply channel 5 and the discharge channel 6 is provided in parallel with the control passage 19. In the middle of the suction passage 10, a suction check valve 11 that allows only a flow of the fluid directed from the discharge channel 6 to the supply channel 5 is provided. For this reason, the suction passage 10 is a unidirectional passage that allows only a flow of the fluid directed from the discharge channel 6 to the supply channel 5.

In the middle of the supply channel 5, a supply-side check valve 12 is provided between the control valve V and the pump 4. The supply-side check valve 12 is provided closer to the pump 4 side in the middle of the supply channel 5, compared to the connection point of the control passage 19 and the suction passage 10. The supply-side check valve 12 allows only a flow directed from the pump 4 side to the control valve V side and inhibits the opposite flow. Therefore, even when the pressure of the direction switching valve 9 side becomes higher than the discharged pressure of the pump 4, a reverse flow of the fluid to the pump 4 side is inhibited by closing the supply-side check valve 12.

The actuator device AD is configured as described above. In a normal operation in which the motor 13, the pump 4, the direction switching valve 9, and the control valve V are normally operated, basically, the pump 4 is driven by the motor 13, so that the fluid is supplied to one chamber of the extension-side chamber R1 and the contraction-side chamber R2, which is connected to the pump 4 through the direction switching valve 9, and the fluid is discharged from the other chamber to the reservoir R through the discharge channel 6. As a result, it is possible to actively extend or contract the actuator body A.

If the thrust force generated in the actuator body A is in the extension direction of the actuator body A, the direction switching valve 9 has the contraction-side supply position 9c, so that the contraction-side chamber R2 is connected to the supply channel 5, and the extension-side chamber R1 is connected to the reservoir R. On the contrary, if the thrust force generated in the actuator body A has a contraction direction of the actuator body A, the direction switching valve 9 has the extension-side supply position 9b, so that the extension-side chamber R1 is connected to the supply channel 5, and the contraction-side chamber R2 is connected to the reservoir R. In addition, by adjusting the pressure of the supply channel 5 using the control valve V, a magnitude of the thrust force in the extending or contracting direction of the actuator body A can be controlled.

Figure 3:
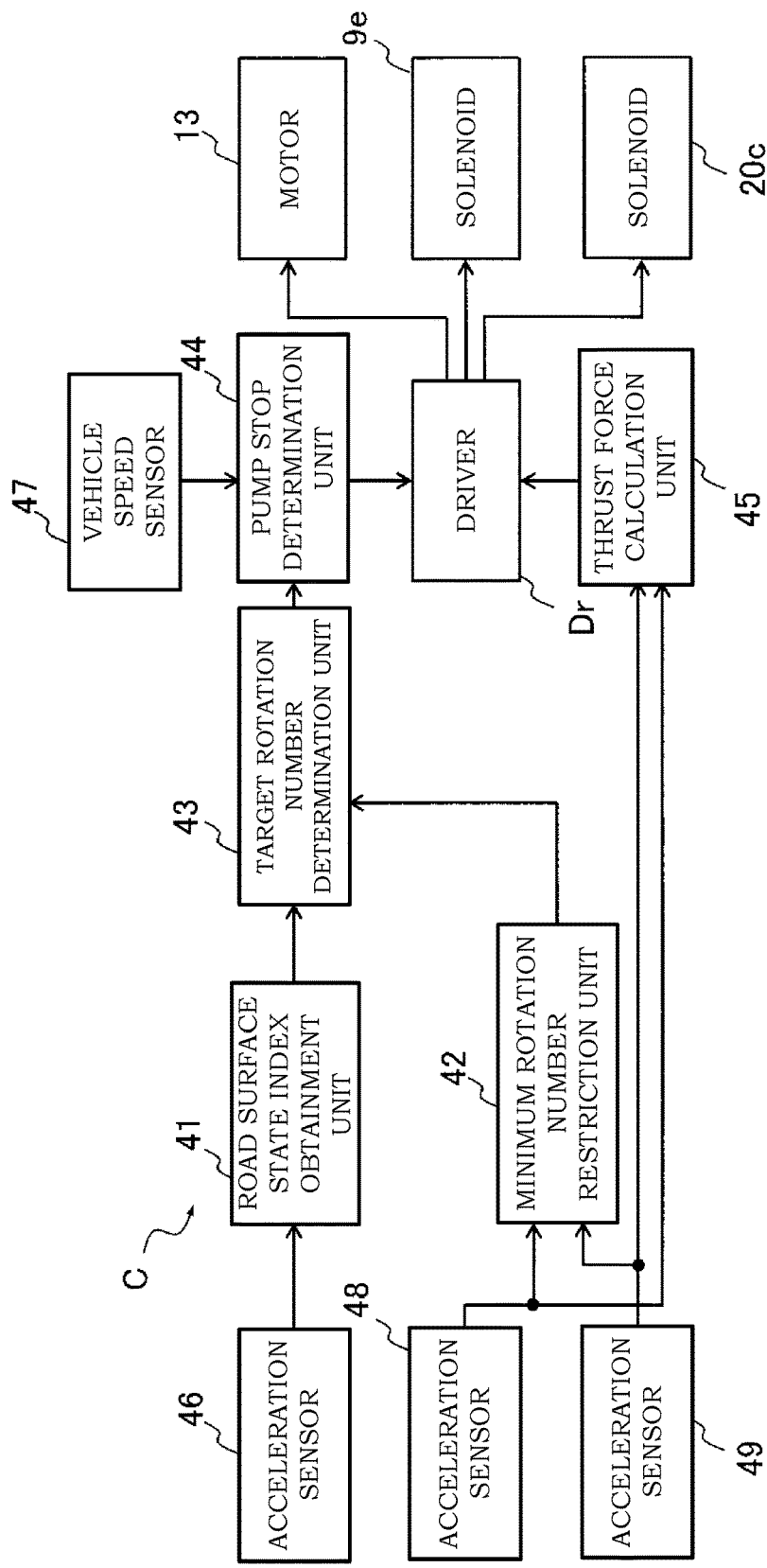
FIG. 3 is a control block diagram of a controller of the suspension device according to an embodiment of the invention.

In the control of the thrust force, as illustrated in FIG. 3, the controller C is used, in which the control valve V, the direction switching valve 9, and the motor 13 are controlled depending on an output value of a sensor that detects a vehicle vibration status.

The controller C receives information, by which a vehicle vibration status necessary in a control rule suitable for vehicle vibration suppression can be recognized, such as a vertical velocity or acceleration of the sprung member B or the unsprung member W, and an extension/contraction velocity or acceleration of the actuator body A.

The controller C obtains a target thrust force to be generated in the actuator body A on the basis of the received information according to the control rule. In addition, the controller C determines the electric current amount supplied to the control valve V, the positions $9b$ or $9c$ of the direction switching valve 9, and the electric current amount supplied to the motor 13 that drives the pump 4 in order to generate a target thrust force in the actuator body A, and supplies the electric current. Note that the control rule used in control of the thrust force of the suspension device S may be appropriately selected depending on a vehicle.

As described above, the actuator body A can be actively extended or contracted. However, during a vehicle travel, the actuator body A is extended or contracted by receiving a disturbance from unevenness on a road surface. In this regard, an operation performed when the actuator body A is extended or contracted by receiving a disturbance will now be described.

First, a case where the fluid is discharged to the supply channel 5 by driving the pump 4 will be described. When the actuator body A is extended or contracted by receiving a disturbance, four cases may be conceived depending on a direction of the thrust force generated by the actuator body A and an extending/contracting direction of the actuator body A.

First, a case where the suspension device S exerts a thrust force for pushing down the piston 2, and the actuator body A makes an extending motion by an external force will be described.

Since the thrust force generated in the actuator body A has a direction of pushing down the piston 2, it is necessary to supply the fluid to the extension-side chamber R1. In this regard, the direction switching valve 9 is switched to the extension-side supply position $9b$, so that the extension-side chamber R1 and the supply channel 5 communicates with each other, and the contraction-side chamber R2 communicates with the reservoir R through the discharge channel 6.

When the actuator body A makes an extending motion, a volume of the extension-side chamber R1 is reduced. For this reason, as much as the volume is reduced, the fluid is discharged from the extension-side chamber R1 through the extension-side damping valve 15, and then flows to the reservoir R through the supply channel 5 and the control valve V. Note that, since the supply-side check valve 12 is provided, the fluid does not reversely flow to the pump 4 side although the pressure of the supply channel 5 may temporarily rise over the discharged pressure of the pump 4. Meanwhile, as much as the volume increase amount, the fluid flows from the reservoir R through the discharge channel 6 to the contraction-side chamber R2 whose volume increases.

Figure 4:
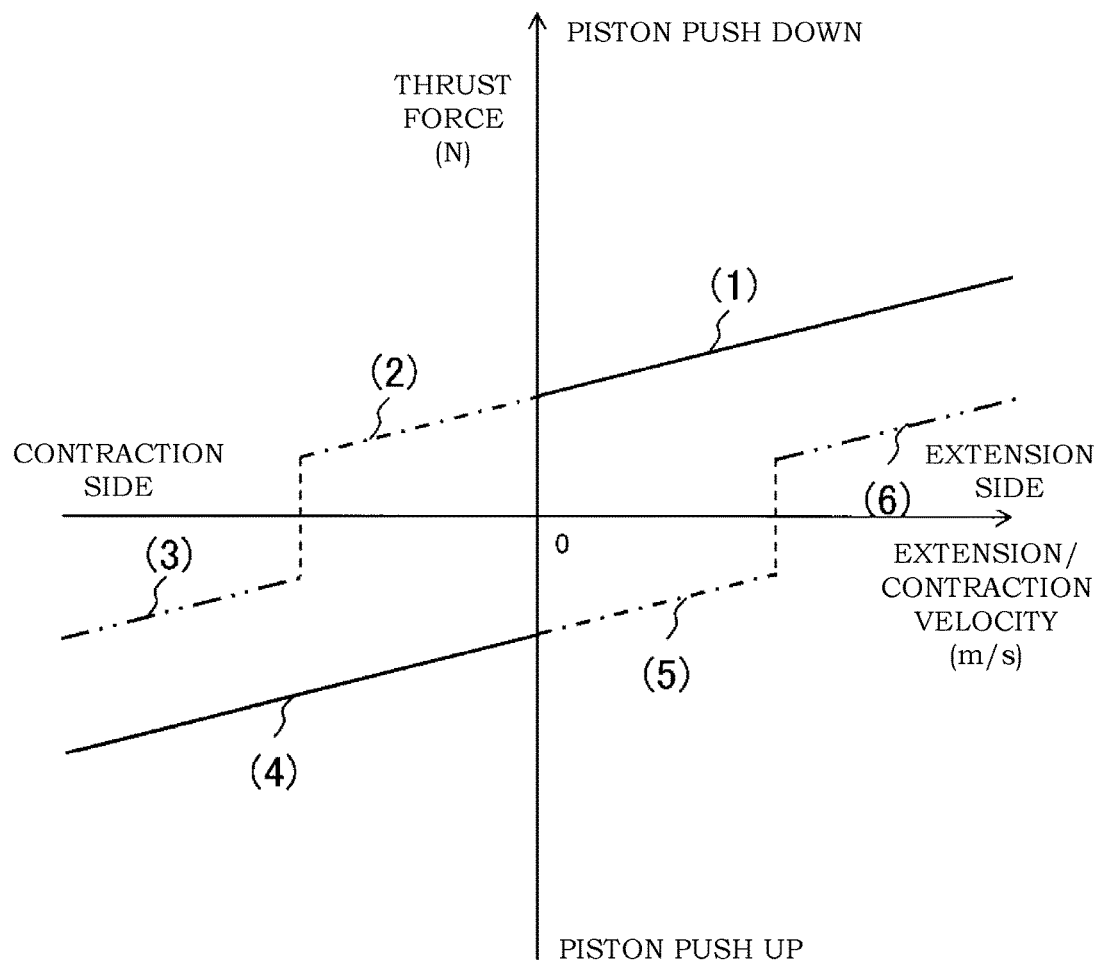
FIG. 4 is a diagram illustrating a thrust force characteristic when the suspension device according to an embodiment of the invention serves as an active suspension.

The pressure of the supply channel 5 is controlled by the control valve V to the valve open pressure of the control valve V. For this reason, the pressure of the extension-side chamber R1 becomes higher than the pressure of the supply channel 5 as much as a pressure loss generated when the fluid discharged from the extension-side chamber R1 passes through the extension-side damping valve 15. Therefore, in this case, the pressure of the extension-side chamber R1 becomes higher than the pressure of the reservoir R as much as a pressure obtained by adding the valve open pressure of the control valve V and the pressure loss caused by the extension-side damping valve 15. The thrust force of the actuator body A becomes a product of a pressure-receiving area and a pressure of the extension-side chamber R1, where the pressure-receiving area refers to an area of the piston 2 adjoining the extension-side chamber R1 (the area obtained by subtracting a cross-sectional area of the rod 3 from the area of the piston 2). Therefore, referring to the graph of FIG. 4 in which the ordinate denotes a direction of the thrust force of the actuator body A, and the abscissa denotes the extension/contraction velocity of the actuator body A, the thrust force of the actuator body A obtained by maximizing the valve open pressure of the control valve V has a characteristic indicated by the line (1) in FIG. 4. Note that, in this case, a force corresponding to the product of the pressure of the contraction-side chamber R2 and the pressure-receiving area adjoining the contraction-side chamber R2 of the piston 2 is generated as a thrust force for pushing up the piston 2. However, since the pressure of the extension-side chamber R1 is higher than the pressure of the reservoir R, and the pressure of the contraction-side chamber R2 is equal to the pressure of the reservoir R, the thrust force for pushing up the piston 2 may be regarded as zero by assuming that the pressure of the extension-side chamber R1 is a difference pressure from the pressure of the reservoir R.

Subsequently, a case where the thrust force for pushing down the piston 2 is exerted in the suspension device S, and the actuator body A is contracted by an external force will be described. Since the direction of the thrust force generated in the actuator body A is a direction of pushing down the piston 2, it is necessary to supply the fluid to the extension-side chamber R1. In this case, the direction switching valve 9 is switched to the extension-side supply position $9b$, so that the extension-side chamber R1 is connected to the supply channel 5, and the contraction-side chamber R2 communicates with the reservoir R through the discharge channel 6.

When the actuator body A is contracted, the volume of the extension-side chamber R1 increases. If the discharge flow rate of the pump 4 is equal to or higher than the volume increase amount of the extension-side chamber R1 per unit time, the discharge flow rate of the pump 4 becomes higher than the flow rate necessary in the extension-side chamber R1. For this reason, the fluid discharged from the pump 4 flows to the extension-side chamber R1 through the extension-side check valve 16, and the remaining fluid that is not drawn into the extension-side chamber R1 out of the discharge flow rate of the pump 4 returns to the reservoir R through the control valve V. Therefore, the pressure of the extension-side chamber R1 is controlled to become equal to the pressure of the supply channel 5 and to the valve open pressure of the control valve V.

Meanwhile, from the contraction-side chamber R2 whose volume decreases, the fluid as much as the volume decrease amount is discharged to the reservoir R through the contraction-side damping valve 17 and the discharge channel 6. The pressure of the contraction-side chamber R2 becomes higher than the pressure of the reservoir R as much as the pressure loss generated when the fluid discharged from the contraction-side chamber R2 passes through the contraction-side damping valve 17. Therefore, the pressure of the extension-side chamber R1 becomes equal to the valve open pressure of the control valve V, and the pressure of the contraction-side chamber R2 becomes higher than the pressure of the reservoir R as much as the pressure loss caused by the contraction-side damping valve 17. Furthermore, as the flow rate discharged from the contraction-side chamber R2 increases, the pressure loss caused by the contraction-side damping valve 17 also increases. Accordingly, the pressure of the contraction-side chamber R2 also increases.

The thrust force of the actuator body A becomes a force obtained by subtracting a product of the pressure of the contraction-side chamber R2 and the pressure-receiving area of the contraction-side chamber R2 side of the piston 2 from a product of the pressure of the extension-side chamber R1 and the pressure-receiving area of the extension-side chamber R1 side of the piston 2. Here, as the flow rate discharged from the contraction-side chamber R2 increases, the pressure loss also increases, and the thrust force of the actuator body A is reduced accordingly. Therefore, if the thrust force for pushing down the piston 2 is exerted in the suspension device S, the actuator body A is contracted by an external force, and the discharge flow rate of the pump 4 is equal to or higher than the volume increase amount of the extension-side chamber R1 per unit time, the thrust force of the actuator body A obtained by maximizing the valve open pressure of the control valve V has a characteristic indicated by the line (2) in FIG. 4.

In contrast, if the contraction rate of the actuator body A is high, and the discharge flow rate of the pump 4 is lower than the volume increase amount of the extension-side chamber R1 per unit time, the fluid supplied from the pump 4 fails to follow the volume increase amount of the extension-side chamber R1 per unit time. In this manner, if the fluid discharged from the pump 4 is entirely drawn into the extension-side chamber R1, the fluid does not pass through the control valve V. In addition, the amount of fluid short in the extension-side chamber R1 is supplied from the reservoir R through the discharge channel 6 and the suction passage 10 by opening the suction check valve 11.

In this case, the pressure of the extension-side chamber R1 becomes nearly equal to the pressure of the reservoir R, and the pressure of the contraction-side chamber R2 becomes higher than the pressure of the reservoir R as much as the pressure loss caused by the contraction-side damping valve 17. For this reason, the actuator body A is not allowed to exert the thrust force to a direction of pushing down the piston 2, and the thrust force is exerted in the opposite direction, that is, in a direction of pushing up the piston 2.

Therefore, if the thrust force for pushing down the piston 2 is exerted in the suspension device S, the actuator body A is contracted by an external force, and the discharge flow rate of the pump 4 is lower than the volume increase amount of the extension-side chamber R1 per unit time, it is impossible to exert the thrust force in the direction of pushing down the piston 2. For this reason, regardless of the magnitude of the valve open pressure of the control valve V, the thrust force of the actuator body A has a characteristic indicated by the line (3) in FIG. 4. That is, if the valve open pressure of the control valve V is maximized, and the discharge flow rate of the pump 4 is equal to or higher than the volume increase amount of the extension-side chamber R1 per unit time, the thrust force of the actuator body A has a characteristic indicated by the line (2) in FIG. 4. Meanwhile, if the discharge flow rate of the pump 4 is lower than the volume increase amount of the extension-side chamber R1 per unit time, the characteristic of the thrust force of the actuator body A is changed as indicated by the line (3) in FIG. 4.

Next, a case where the thrust force for pushing up the piston 2 is exerted in the suspension device S, and the actuator body A is contracted by an external force will be described.

In this case, since the direction of the thrust force generated in the actuator body A is a direction of pushing up the piston 2, it is necessary to supply the fluid to the contraction-side chamber R2. In this regard, the direction switching valve 9 is switched to the contraction-side supply position 9c, so that the contraction-side chamber R2 communicates with the supply channel 5, and the extension-side chamber R1 communicates with the reservoir R through the discharge channel 6.

When the actuator body A is contracted, the volume of the contraction-side chamber R2 is reduced. For this reason, as much as the reduced volume, the fluid is discharged from the contraction-side chamber R2 through the contraction-side damping valve 17, and then flows to the reservoir R through the supply channel 5 and the control valve V. Note that, since the supply-side check valve 12 is provided, the fluid does not reversely flow to the pump 4 side although the pressure of the supply channel 5 may temporarily increase over the discharged pressure of the pump 4. Meanwhile, the fluid corresponding to the volume increase amount is supplied from the reservoir R through the discharge channel 6 to the extension-side chamber R1 whose volume increases.

The pressure of the supply channel 5 is controlled by the control valve V to the valve open pressure of the control valve V. For this reason, the pressure of the contraction-side chamber R2 becomes higher than the pressure of the supply channel 5 as much as the pressure loss generated when the fluid discharged from the contraction-side chamber R2 passes through the contraction-side damping valve 17. Therefore, in this case, the pressure of the contraction-side chamber R2 becomes higher than the pressure of the reservoir R as much as the pressure obtained by adding the pressure loss caused by the contraction-side damping valve 17 to the valve open pressure of the control valve V. The thrust force of the actuator body A becomes a product of a pressure-receiving area and the pressure of the contraction-side chamber R2, where the pressure-receiving area refers to an area of the piston 2 adjoining the contraction-side chamber R2 (the area of the piston 2). Therefore, referring to the graph of FIG. 4, the thrust force of the actuator body A obtained by maximizing the valve open pressure of the control valve V has a characteristic indicated by the line (4) in FIG. 4. Note that, in this case, a force corresponding to the product of the pressure of the extension-side chamber R1 and the pressure-receiving area of the extension-side chamber R1 of the piston 2 is generated as a thrust force for pushing down the piston 2. However, since the pressure of the contraction-side chamber R2 is higher than the pressure of the reservoir R, and the pressure of the extension-side chamber R1 is equal to the pressure of the reservoir R, the thrust force for pushing down the piston 2 may be regarded as zero by assuming that the pressure of the contraction-side chamber R2 is a difference pressure from the pressure of the reservoir R.

Next, a case where the thrust force for pushing up the piston 2 is exerted in the suspension device S, and the actuator body A is extended by an external force will be described. Since the direction of the thrust force generated in the actuator body A is a direction of pushing up the piston 2, it is necessary to supply the fluid to the contraction-side chamber R2. Similarly, in this case, the direction switching valve 9 is switched to the contraction-side supply position 9c, so that the contraction-side chamber R2 is connected to the supply channel 5, and the extension-side chamber R1 communicates with the reservoir R through the discharge channel 6.

When the actuator body A is extended, the volume of the contraction-side chamber R2 increases. If the discharge flow rate of the pump 4 is equal to or higher than the volume increase amount of the contraction-side chamber R2 per unit time, the discharge flow rate of the pump 4 becomes higher than the flow rate necessary in the contraction-side chamber R2. For this reason, the fluid discharged from the pump 4 flows to the contraction-side chamber R2 through the contraction-side check valve 18, and the remaining fluid that is not drawn into the contraction-side chamber R2 out of the discharge flow rate of the pump 4 returns to the reservoir R through the control valve V. Therefore, the pressure of the contraction-side chamber R2 becomes equal to the pressure of the supply channel 5 and is controlled to the valve open pressure of the control valve V.

Meanwhile, from the extension-side chamber R1 whose volume decreases, the fluid as much as the volume decrease amount is discharged to the reservoir R through the extension-side damping valve 15 and the discharge channel 6. The pressure of the extension-side chamber R1 becomes higher than the pressure of the reservoir R as much as the pressure loss generated when the fluid discharged from the extension-side chamber R1 passes through the extension-side damping valve 15. Therefore, the pressure of the contraction-side chamber R2 becomes equal to the valve open pressure of the control valve V, and the pressure of the extension-side chamber R1 becomes higher than the pressure of the reservoir R as much as the pressure loss caused by the extension-side damping valve 15. Furthermore, as the flow rate discharged from the extension-side chamber R1 increases, the pressure loss caused by the extension-side damping valve 15 also increases. Accordingly, the pressure of the extension-side chamber R1 also increases.

The thrust force of the actuator body A becomes a force obtained by subtracting a product of the pressure of the extension-side chamber R1 and the pressure-receiving area of the extension-side chamber R1 side of the piston 2 from a product of the pressure of the contraction-side chamber R2 and the pressure-receiving area of the contraction-side chamber R2 side of the piston 2. Here, as the flow rate discharged from the extension-side chamber R1 increases, the pressure loss also increases, and the thrust force of the actuator body A is reduced accordingly. Therefore, if the thrust force for pushing up the piston 2 is exerted in the suspension device S, the actuator body A is extended by an external force, and the discharge flow rate of the pump 4 is equal to or higher than the volume increase amount of the contraction-side chamber R2 per unit time, the thrust force of the actuator body A obtained by maximizing the valve open pressure of the control valve V has a characteristic indicated by the line (5) in FIG. 4.

In contrast, if the extension rate of the actuator body A is high, and the discharge flow rate of the pump 4 is lower than the volume increase amount of the contraction-side chamber R2 per unit time, the fluid supplied from the pump 4 fails to follow the volume increase amount of the contraction-side chamber R2 per unit time. In this manner, if the fluid discharged from the pump 4 is entirely drawn into the contraction-side chamber R2, the fluid does not pass through the control valve V. In addition, the amount of fluid short in the contraction-side chamber R2 is supplied from the reservoir R through the discharge channel 6 and the suction passage 10 by opening the suction check valve 11.

In this case, the pressure of the contraction-side chamber R2 becomes nearly equal to the pressure of the reservoir R, and the pressure of the extension-side chamber R1 becomes higher than the pressure of the reservoir R as much as the pressure loss caused by the extension-side damping valve 15. For this reason, the actuator body A is not allowed to exert the thrust force to a direction of pushing up the piston 2, and the thrust force is exerted in the opposite direction, that is, in a direction of pushing down the piston 2.

Therefore, if the thrust force for pushing up the piston 2 is exerted in the suspension device S, the actuator body A is extended by an external force, and the discharge flow rate of the pump 4 is lower than the volume increase amount of the contraction-side chamber R2 per unit time, it is impossible to exert the thrust force in the direction of pushing up the piston 2. For this reason, regardless of the magnitude of the valve open pressure of the control valve V, the thrust force of the actuator body A has a characteristic indicated by the line (6) in FIG. 4. That is, if the valve open pressure of the control valve V is maximized, and the discharge flow rate of the pump 4 is equal to or higher than the volume increase amount of the contraction-side chamber R2 per unit time, the thrust force of the actuator body A has a characteristic indicated by the line (5) in FIG. 4. Meanwhile, if the discharge flow rate of the pump 4 is lower than the volume increase amount of the contraction-side chamber R2 per unit time, the characteristic of the thrust force of the actuator body A is changed as indicated by the line (6) in FIG. 4. Note that the actuator body A exhibits a change of the thrust force characteristic from the line (2) to the line (3) in FIG. 4 in the contraction side, and exhibits a change of the thrust force characteristic from the line (5) to the line (6) in FIG. 4 in the extension side. Such a change of the characteristic is very transient and insignificantly affects a ride quality.

In the aforementioned description, by adjusting the valve open pressure of the control valve V, the thrust force of the actuator body A can be changed from a line obtained by linking the lines (1) to (3) to a line obtained by linking the lines (4) to (6). In addition, if the discharge flow rate of the pump 4 is supplied to an extending chamber of the extension-side chamber R1 and the contraction-side chamber R2 by driving the pump 4, and the discharge flow rate of the pump 4 is equal to or higher than the volume increase amount of the extending chamber, the thrust force can be exerted in the same direction as the extending/contracting direction of the actuator body A.

Next, an operation of the suspension device S performed when the pump 4 stops without being driven will be described. Similarly, in this case, four cases may be conceived depending on an extending/contracting direction of the actuator body A by receiving a disturbance and a direction of the thrust force generated by the actuator body A.

First, a case where the suspension device S exerts a thrust force for pushing down the piston 2, and the actuator body A makes an extending motion by an external force will be described.

Since the thrust force generated in the actuator body A has a direction of pushing down the piston 2, the direction switching valve 9 is switched to the extension-side supply position 9b, so that the extension-side chamber R1 is connected to the supply channel 5, and the contraction-side chamber R2 communicates with the reservoir R through the discharge channel 6.

When the actuator body A makes an extending motion, a volume of the extension-side chamber R1 is reduced. For this reason, as much as the volume is reduced, the fluid is discharged from the extension-side chamber R1 through the extension-side damping valve 15, and then flows to the reservoir R through the supply channel 5 and the control valve V. Note that, since the supply-side check valve 12 is provided, the fluid does not flow to the pump 4 side. Meanwhile, as much as the volume increase amount, the fluid flows from the reservoir R through the discharge channel 6 to the contraction-side chamber R2 whose volume increases.

Figure 5:
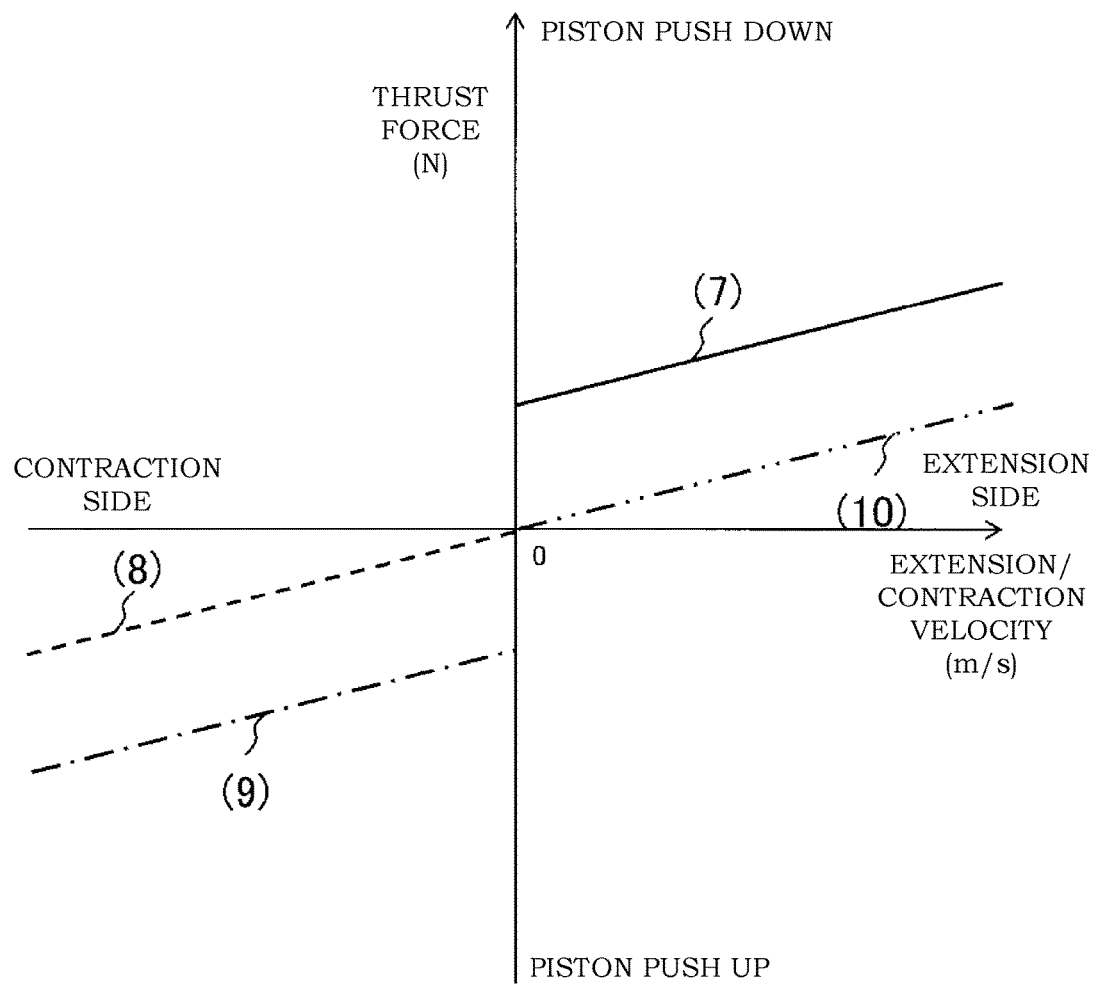
FIG. 5 is a diagram illustrating a thrust force characteristic when the suspension device according to an embodiment of the invention serves as a semi-active suspension.

The pressure of the supply channel 5 is controlled by the control valve V to the valve open pressure of the control valve V. For this reason, the pressure of the extension-side chamber R1 becomes higher than the pressure of the supply channel 5 as much as a pressure loss generated when the fluid discharged from the extension-side chamber R1 passes through the extension-side damping valve 15. Therefore, in this case, the pressure of the extension-side chamber R1 becomes higher than the pressure of the reservoir R as much as a pressure obtained by adding the valve open pressure of the control valve V to the pressure loss caused by the extension-side damping valve 15. The thrust force of the actuator body A becomes a product of the pressure-receiving area of the extension-side chamber R1 of the piston 2 and the pressure of the extension-side chamber R1. Therefore, referring to the graph of FIG. 5 in which the ordinate denotes the direction of the thrust force of the actuator body A, and the abscissa denotes the extension/contraction velocity of the actuator body A, the thrust force of the actuator body A obtained by maximizing the valve open pressure of the control valve V has a characteristic indicated by the line (7) in FIG. 5. Therefore, by adjusting the valve open pressure of the control valve V, the thrust force of the actuator body A can be changed within a range between the abscissa and the line (7) of the first quadrant of FIG. 5. Note that, in this case, a force corresponding to the product of the pressure of the contraction-side chamber R2 and the pressure-receiving area adjoining the contraction-side chamber R2 of the piston 2 is generated as a thrust force for pushing up the piston 2. However, since the pressure of the extension-side chamber R1 is higher than the pressure of the reservoir R, and the pressure of the contraction-side chamber R2 is equal to the pressure of the reservoir R, the thrust force for pushing up the piston 2 may be regarded as zero by assuming that the pressure of the extension-side chamber R1 is a difference pressure from the pressure of the reservoir R.

Subsequently, a case where the thrust force for pushing down the piston 2 is exerted in the suspension device S, and the actuator body A is contracted by an external force will be described. Since the pump 4 has a stop state, the fluid is not supplied from the pump 4. However, since the direction of the thrust force generated in the actuator body A is a direction of pushing down the piston 2, the direction switching valve 9 is switched to the extension-side supply position 9b, so that the extension-side chamber R1 is connected to the supply channel 5, and the contraction-side chamber R2 communicates with the reservoir R through the discharge channel 6.

When the actuator body A is contracted, the volume of the extension-side chamber R1 increases. Since the pump 4 does not discharge the fluid, the fluid does not flow to the control valve V, and the amount of the fluid short in the extension-side chamber R1 is supplied from the reservoir R through the discharge channel 6 and the suction passage 10 by opening the suction check valve 11. For this reason, the pressure of the extension-side chamber R1 becomes nearly equal to the pressure of the reservoir R.

Meanwhile, from the contraction-side chamber R2 whose volume decreases, the fluid as much as the volume decrease amount is discharged to the reservoir R through the contraction-side damping valve 17 and the discharge channel 6. The pressure of the contraction-side chamber R2 becomes higher than the pressure of the reservoir R as much as the pressure loss generated when the fluid discharged from the contraction-side chamber R2 passes through the contraction-side damping valve 17. For this reason, the actuator body A fails to exert the thrust force for pushing down the piston 2, but exerts the thrust force in the opposite direction, that is, in the direction of pushing up the piston 2.

Therefore, if the thrust force for pushing down the piston 2 is exerted in the suspension device S, the actuator body A is contracted by an external force, and the pump 4 stops, it is impossible to exert the thrust force in the direction of pushing down the piston 2. For this reason, regardless of the magnitude of the valve open pressure of the control valve V, the thrust force of the actuator body A has a characteristic indicated by the line (8) in FIG. 5. This causes an effect similar to that generated when the contraction-side damping force is controlled to the lowest damping force in the variable damping-force damper.

Next, a case where the thrust force for pushing up the piston 2 is exerted in the suspension device S, and the actuator body A is contracted by an external force will be described. Since the direction of the thrust force generated in the actuator body A is a direction of pushing up the piston 2, the direction switching valve 9 is switched to the contraction-side supply position 9c, so that the contraction-side chamber R2 is connected to the supply channel 5, and the extension-side chamber R1 communicates with the reservoir R through the discharge channel 6.

When the actuator body A is contracted, the volume of the contraction-side chamber R2 is reduced. For this reason, as much as the reduced volume, the fluid is discharged from the contraction-side chamber R2 through the contraction-side damping valve 17, and then flows to the reservoir R through the supply channel 5 and the control valve V. Note that, since the supply-side check valve 12 is provided, the fluid does not flow to the pump 4. Meanwhile, the fluid corresponding to the volume increase amount is supplied from the reservoir R through the discharge channel 6 to the extension-side chamber R1 whose volume increases.

The pressure of the supply channel 5 is controlled by the control valve V to the valve open pressure of the control valve V. For this reason, the pressure of the contraction-side chamber R2 becomes higher than the pressure of the supply channel 5 as much as the pressure loss generated when the fluid discharged from the contraction-side chamber R2 passes through the contraction-side damping valve 17. Therefore, in this case, the pressure of the contraction-side chamber R2 increases over the pressure of the reservoir R as much as the pressure obtained by adding the pressure loss caused by the contraction-side damping valve 17 to the valve open pressure of the control valve V. The thrust force of the actuator body A becomes a product of the pressure-receiving area of the contraction-side chamber R2 of the piston 2 and the pressure of the contraction-side chamber R2. Therefore, referring to the graph of FIG. 5, the thrust force of the actuator body A obtained by maximizing the valve open pressure of the control valve V has a characteristic indicated by the line (9) in FIG. 5. Therefore, by adjusting the valve open pressure of the control valve V, the thrust force of the actuator body A can be changed from the abscissa to the line (9) within the third quadrant. Note that, in this case, a force corresponding to the product of the pressure of the extension-side chamber R1 and the pressure-receiving area adjoining the extension-side chamber R1 of the piston 2 is generated as the thrust force for pushing down the piston 2. However, since the pressure of the contraction-side chamber R2 is higher than the pressure of the reservoir R, and the pressure of the extension-side chamber R1 is equal to the pressure of the reservoir R, the thrust force for pushing down the piston 2 may be regarded as zero by assuming that the pressure of the contraction-side chamber R2 is a difference pressure from the pressure of the reservoir R.

Subsequently, a case where the thrust force for pushing up the piston 2 is exerted in the suspension device S, and the actuator body A is extended by an external force will be described. Since the pump 4 has a stop state, the fluid is not supplied from the pump 4. However, since the direction of the thrust force generated in the actuator body A is a direction of pushing up the piston 2, the direction switching valve 9 is switched to the contraction-side supply position 9c, so that the contraction-side chamber R2 is connected to the supply channel 5, and the extension-side chamber R1 communicates with the reservoir R through the discharge channel 6.

When the actuator body A is extended, the volume of the contraction-side chamber R2 increases. Since the pump 4 does not discharge the fluid, the fluid does not flow to the control valve V, and the amount of the fluid short in the contraction-side chamber R2 is supplied from the reservoir R through the discharge channel 6 and the suction passage 10 by opening the suction check valve 11. For this reason, the pressure of the contraction-side chamber R2 becomes nearly equal to the pressure of the reservoir R.

Meanwhile, from the extension-side chamber R1 whose volume decreases, the fluid as much as the volume decrease amount is discharged to the reservoir R through the extension-side damping valve 15 and the discharge channel 6. The pressure of the extension-side chamber R1 increases over the pressure of the reservoir R as much as the pressure loss generated when the fluid discharged from the extension-side chamber R1 passes through the extension-side damping valve 15. For this reason, the actuator body A fails to exert the thrust force for pushing up the piston 2, but exerts the thrust force in the opposite direction, that is, in the direction of pushing down the piston 2.

Therefore, if the thrust force for pushing up the piston 2 is exerted in the suspension device S, the actuator body A is extended by an external force, and the pump 4 stops, it is impossible to exert the thrust force in the direction of pushing up the piston 2. For this reason, regardless of the magnitude of the valve open pressure of the control valve V, the thrust force of the actuator body A has a characteristic indicated by the line (10) in FIG. 5. This causes an effect similar to that generated when the extension-side damping force is controlled to the lowest damping force in the variable damping-force damper.

Here, considering that, typically, in a semi-active suspension, a skyhook control is performed on the basis of the Carnot's theorem using the variable damping-force damper, if the extension-side damping force (the force for pushing down the piston) is necessary, the damping force of the variable damping-force damper is controlled to a damping force for obtaining the target thrust force in the event of the extending motion. In addition, in the event of the contracting motion, since the extension-side damping force is not obtained, the control is performed such that the lowest damping force is exerted to the contraction side. Meanwhile, if the contraction-side damping force (the force for pushing up the piston) is necessary, the damping force of the variable damping-force damper is controlled to a damping force for obtaining the target thrust force in the event of the contracting motion. In addition, in the event of the extending motion, since the contraction-side damping force is not obtained, the control is performed such that the lowest damping force is exerted to the extension side.

In contrast, in the suspension device S according to this embodiment, if the thrust force for pushing down the piston 2 is exerted in the actuator body A while the pump 4 stops, the thrust force of the actuator body A is controlled within an output allowable range by adjusting the valve open pressure of the control valve V in the event of the extending motion. In the event of the contracting motion, the actuator body A exerts the lowest thrust force out of the thrust forces for pushing up the piston 2 even when the actuator body A is desired to exert the thrust force for pushing down the piston 2.

On the contrary, if the thrust force for pushing up the piston 2 is exerted in the actuator body A, the thrust force of the actuator body A is controlled within an output allowable range by adjusting the valve open pressure of the control valve V in the event of the contracting motion. In the event of the extending motion, the actuator body A exerts the lowest thrust force out of the thrust forces for pushing down the piston 2 even when the actuator body A is desired to exert the thrust force for pushing up the piston 2.

Therefore, the suspension device S can automatically operate as a semi-active suspension while the pump 4 stops. This means that, if the discharge flow rate of the pump 4 is lower than the volume increase amount of the extending extension-side chamber R1 or the contraction-side chamber R2, the suspension device S automatically serves as the semi-active suspension even while the pump 4 is driven.

Subsequently, the operation of the suspension device S in the event of a failure generated when it is impossible to electrically conduct the motor 13, the direction switching valve 9, and the control valve V of the suspension device S due to any abnormality will be described. Such a failure also includes, for example, a case where electric conduction of the motor 13, the direction switching valve 9, and the control valve V is interrupted due to an abnormality in the controller C in addition to a case where it is impossible to electrically conduct the motor 13, the direction switching valve 9, and the control valve V.

In the event of a failure, electric conduction to the motor 13, the direction switching valve 9, and the control valve V is interrupted or impossible, and the pump 4 stops. In addition, the valve open pressure of the control valve V is minimized, and the direction switching valve 9 is biased by the spring 9d to the extension-side supply position 9b.

If the actuator body A is extended by an external force in this state, the volume of the extension-side chamber R1 is reduced. For this reason, as much as the reduced volume, the fluid is discharged from the extension-side chamber R1 through the extension-side damping valve 15, and then flows to the reservoir R through the supply channel 5 and the control valve V. Note that, since the supply-side check valve 12 is provided, the fluid does not flow to the pump 4 side. Meanwhile, the fluid corresponding to the volume increase amount is supplied from the reservoir R through the discharge channel 6 to the contraction-side chamber R2 whose volume increases.

The fluid discharged from the extension-side chamber R1 passes through the control valve V. Since the control valve V is set to apply nearly no resistance to the flow passing during a non-conduction state, the pressure of the supply channel 5 becomes nearly equal to the pressure of the reservoir R. Therefore, the pressure of the extension-side chamber R1 becomes higher than the pressure of the supply channel 5 as much as the pressure loss generated when the fluid discharged from the extension-side chamber R1 passes through the extension-side damping valve 15. Accordingly, the pressure of the extension-side chamber R1 becomes higher than the pressure of the reservoir R as much as this pressure loss.

Figure 6:
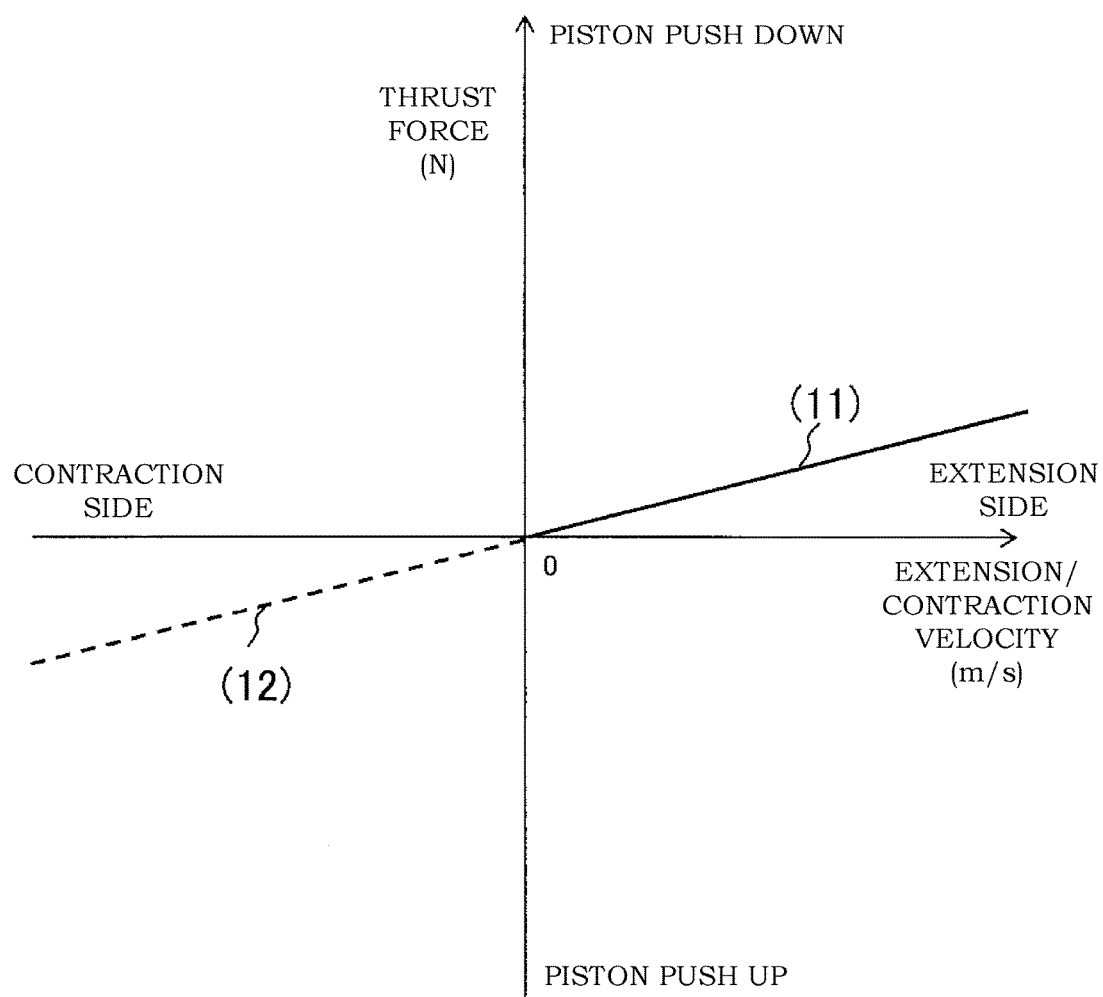
FIG. 6 is a diagram illustrating a thrust force characteristic when a failure occurs in the suspension device according to an embodiment of the invention.

Therefore, the thrust force of the actuator body A becomes a force obtained by multiplying the pressure corresponding to the pressure loss caused by the extension-side damping valve 15 by the pressure-receiving area of the extension-side chamber R1 of the piston 2 and has a characteristic indicated by the line (11) of FIG. 6 in the graph of FIG. 6. Note that, in this case, a force as a product of the pressure of the contraction-side chamber R2 and the pressure-receiving area adjoining the contraction-side chamber R2 of the piston 2 is generated as the thrust force for pushing up the piston 2. However, the pressure of the extension-side chamber R1 is higher than the pressure of the reservoir R, and the pressure of the contraction-side chamber R2 is equal to the pressure of the reservoir R. Therefore, the thrust force for pushing up the piston 2 can be regarded as zero by assuming that the pressure of the extension-side chamber R1 is a difference pressure from the pressure of the reservoir R.

On the contrary, if the actuator body A is contracted by an external force, the volume of the contraction-side chamber R2 is reduced. For this reason, the fluid as much as the volume decrease amount is discharged from the contraction-side chamber R2 through the contraction-side damping valve 17 and flows to the reservoir R. Meanwhile, the fluid corresponding to the volume increase amount is supplied from the reservoir R through the discharge channel 6 the suction passage 10 and the suction check valve 11 to the extension-side chamber R1 whose volume increases.

Therefore, the pressure of the contraction-side chamber R2 becomes higher than the pressure of the reservoir R as much as the pressure loss generated when the fluid discharged from the contraction-side chamber R2 passes through the contraction-side damping valve 17.

Therefore, the thrust force of the actuator body A becomes a force obtained by multiplying the pressure corresponding to the pressure loss caused by the contraction-side damping valve 17 by the pressure-receiving area of the contraction-side chamber R2 of the piston 2 and has a characteristic indicated by the line (12) of FIG. 6 in the graph of FIG. 6. Note that, in this case, a force as a product of the pressure of the extension-side chamber R1 and the pressure-receiving area adjoining the extension-side chamber R1 of the piston 2 is generated as the thrust force for pushing down the piston 2. However, the pressure of the contraction-side chamber R2 is higher than the pressure of the reservoir R, and the pressure of the extension-side chamber R1 is equal to the pressure of the reservoir R. Therefore, the thrust force for pushing down the piston 2 can be regarded as zero by assuming that the pressure of the contraction-side chamber R2 is a difference pressure from the pressure of the reservoir R.

In this manner, while the suspension device S is failed, the actuator body A serves as a passive damper to suppress a vibration in the chassis B and the vehicle wheel W. Therefore, it is possible to reliably perform a fail-safe operation in the event of a failure.

Next, the controller C will be described. As illustrated in FIG. 3, the controller C includes a road surface state index obtainment unit 41, a minimum rotation number restriction unit 42, a target rotation number determination unit 43, a pump stop determination unit 44, a thrust force calculation unit 45, a driver Dr, an acceleration sensor 46 that detects a vertical acceleration of the unsprung member W, a vehicle speed sensor 47 that detects a vehicle speed, an acceleration sensor 48 that detects a horizontal acceleration Glat of the sprung member B, and an acceleration sensor 49 that detects a front-rear direction acceleration Glong of the sprung member B.

The thrust force calculation unit 45 obtains a thrust force to be generated by the actuator device AD necessary in a posture control of the sprung member B in a vehicle in order to suppress a vehicle vibration. Specifically, the target thrust force to be generated in the actuator body A is obtained on the basis of the vehicle information such as information on a vertical acceleration or velocity of the sprung member B or the unsprung member W or information on an expansion/contraction rate or an expansion/contraction acceleration of the actuator body A according to the employed control rule. In addition, the electric current amount applied to the control valve V and the switching position of the direction switching valve 9 necessary to generate a thrust force in the actuator body A through the target thrust force are determined. Note that the thrust force calculation unit 45 obtains the thrust force to be generated by the actuator device AD as the target thrust force by adding a posture control for suppressing a roll, a nose dive, and a squat of the sprung member B as a vehicle chassis by receiving input values of the horizontal acceleration Glat and the front-rear direction acceleration Glong detected by the acceleration sensors 48 and 49 in addition to the vibration suppression control for suppressing a vibration in the sprung member B such as the skyhook control.

If the direction of the target thrust force to be generated by the actuator device AD is an extension direction of the actuator body A, the contraction-side supply position 9c of the direction switching valve 9 is selected. If the direction of the target thrust force is the contraction direction of the actuator body A, the extension-side supply position 9b of the direction switching valve 9 is selected.

Specifically, if the actuator body A is contracted, the fluid is supplied to the extension-side chamber R1, and the fluid from the contraction-side chamber R2 is discharged to the reservoir R. Therefore, the solenoid 9e of the direction switching valve 9 is set to a non-conduction state without supplying an electric current, and the direction switching valve 9 is set to the extension-side supply position 9b. On the contrary, if the actuator body A is extended, the fluid is supplied to the contraction-side chamber R2, and the fluid from the extension-side chamber R1 is discharged from the reservoir R. Therefore, an electric current is supplied to the solenoid 9e of the direction switching valve 9, and the direction switching valve 9 is set to the contraction-side supply position 9c.

That is, the thrust force calculation unit 45 selects whether the electric current amount applied to the direction switching valve 9 is set to zero or a predetermined value for driving the solenoid 9e and outputs it to the driver Dr. The control rule used in the thrust force calculation unit 45 may be selected depending on a vehicle. For example, a so-called skyhook control which is a control rule having an excellent vehicle vibration suppression effect is preferably selected.

The controller C includes the road surface state index obtainment unit 41, the minimum rotation number restriction unit 42, the target rotation number determination unit 43, and the pump stop determination unit 44 in order to control the discharge flow rate of the pump 4 in addition to the control of the thrust force of the actuator device AD.

Figure 7:
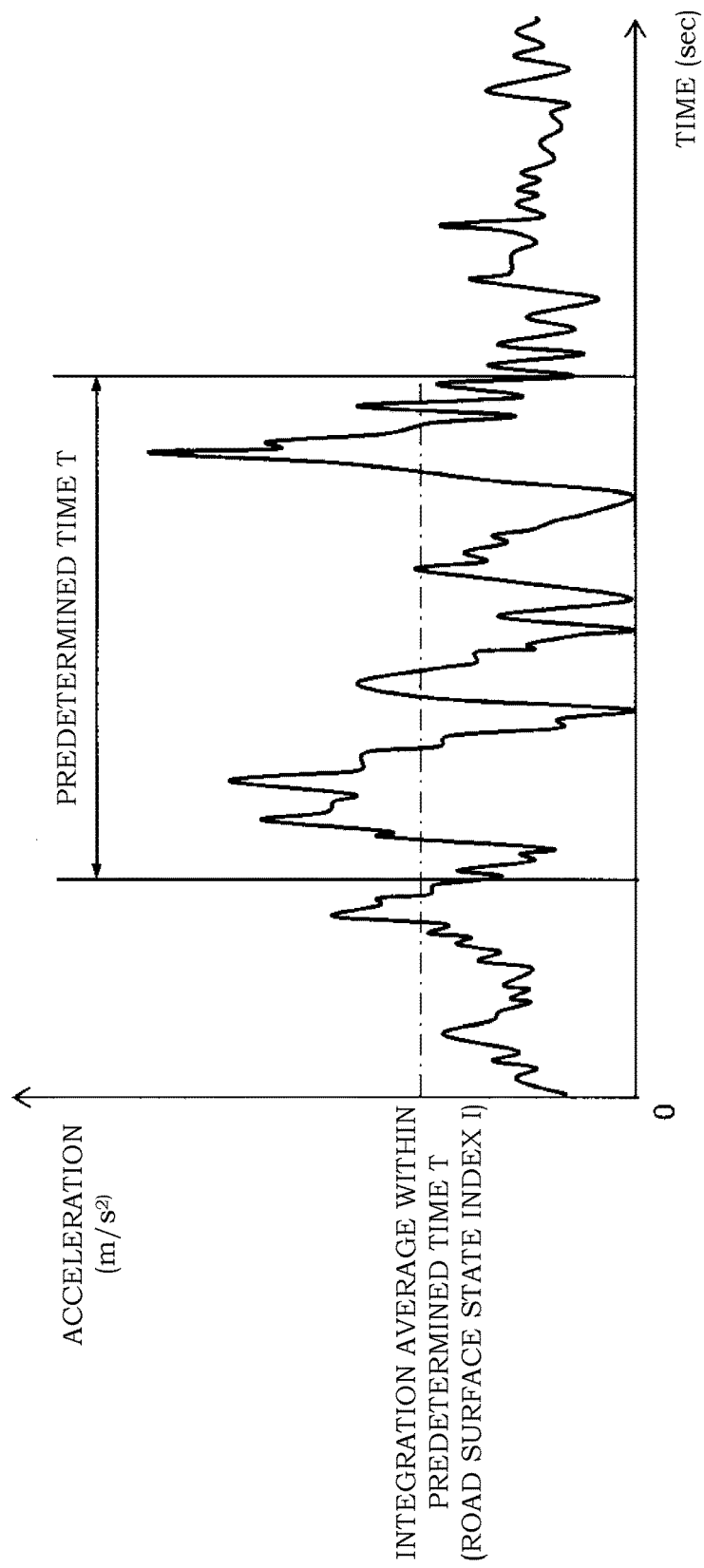
FIG. 7 is a diagram for describing a process for obtaining a road surface state index of a road surface state index obtainment unit.

The road surface state index obtainment unit 41 obtains an integration average of an absolute value of the vertical acceleration of the unsprung member W input from the acceleration sensor 46 within a predetermined time T and sets this integration average as a road surface state index I. Specifically, as illustrated in FIG. 7, an absolute value of the vertical acceleration of the unsprung member W is processed to obtain the road surface state index I by dividing a total sum of the absolute value of the vertical acceleration of the unsprung member W sampled within the predetermined time T by the predetermined time T or the number of data of the vertical acceleration. The predetermined time T is set to a length suitable for obtaining the road surface state index I. The road surface state index obtainment unit 41 obtains the road surface state index I using an acceleration sampled by going back from the time point of calculating the road surface state index I to the predetermined time T. The road surface state index obtainment unit 41 repeats the calculation for obtaining the road surface state index I at a predetermined calculation cycle to continuously updates the road surface state index I to the latest value.

The road surface state index I is a measure representing road surface roughness of a road surface on which a vehicle travels. The greater road surface state index I indicates the more serious undulation or unevenness on the road surface or the rougher road surface. The road surface state index I may be any measure that represents the road surface roughness. Since the road surface roughness affects a motion of the unsprung member W during a vehicle travel, it can be obtained from an acceleration, a velocity, or a displacement of the unsprung member W in the vertical direction, or a relative acceleration, a relative velocity, or a relative displacement between the unsprung member W and the sprung member B in the vertical direction.

The road surface state index I can be calculated by obtaining an integral value of an absolute value, an integration average of the absolute value, a root-mean-square value, a simple average of the absolute value, a maximum value of the absolute value, or frequency distribution of the absolute value for any one of an acceleration, a velocity, or a displacement of the unsprung member W in the vertical direction within a predetermined time range, and a relative acceleration, a relative velocity, or a relative displacement between the unsprung member W and the sprung member B in the vertical direction. For example, when the integral value of the absolute value is employed, the absolute value of the acceleration of the unsprung member W sampled within a range of the predetermined time is integrated. That is, a total sum of each absolute value of the acceleration of the unsprung member W sampled within a range of the predetermined time T is obtained, and this value may be set to the value of the road surface state index I. Naturally, as the road surface state index I is greater, the road surface roughness becomes serious.

If the root-mean-square value is employed as the road surface state index I, a square root of a value obtained by dividing a total sum of the square value of the vertical acceleration of the unsprung member W sampled within the predetermined time T by the number of data of the vertical acceleration may be obtained, and this value may be set as the road surface state index I. In addition, if the frequency distribution is employed as the road surface state index I, a plurality of segments are provided in the absolute value of the vertical acceleration of the unsprung member W, and the segment having the greatest number of the data is set as the road surface state index I. For example, if the segments are provided by segmenting the vertical acceleration of the unsprung member W by 0.5 m/s$^2$, the number of data of the absolute value of the acceleration of each segment is counted. In addition, a value is associated with the segment such that this value increases as the absolute value of the acceleration increases. For example, a value of the segment the absolute value of the acceleration having a range equal to or greater than 0 m/s$^2$ and smaller than 0.5 m/s$^2$ is set to "1," and a value of the upper segment having a range equal to or greater than 0.5 m/s$^2$ and smaller than 1.0 m/s$^2$ is set to "2." In addition, the values for the subsequent upper segments are set to increment by "1." Then, for example, if the number of data of the absolute value of the acceleration sampled for the predetermined time T is greatest in the segment having a range equal to or greater than 1.0 m/s$^2$ and smaller than 1.5 m/s$^2$, the value relating to this segment is becomes "3" according to the aforementioned rule. Therefore, the value of the road surface state index I becomes "3." In this manner, if the frequency distribution is investigated by associating the segment with the value such that the road surface state index I increases as the road surface roughness increases, the road surface state index I increases as the road surface roughness becomes serious. The road surface state index I may be obtained in this manner. The value associated with the segment may be determined arbitrarily. The value may be associated such that it is incremented by one as described above. For example, the value may be associated by setting a median value of the absolute value of the segmented acceleration as the value of the segment.

The minimum rotation number restriction unit 42 compares the horizontal acceleration Glat of the sprung member B input from the acceleration sensor 48 and the horizontal acceleration threshold value α and compares the front-rear direction acceleration Glong of the sprung member B input from the acceleration sensor 49 and the front-rear acceleration threshold value β to set the minimum necessary rotation number. Specifically, if the horizontal acceleration Glat of the sprung member B exceeds the horizontal acceleration threshold value α, or the front-rear direction acceleration Glong of the sprung member B exceeds the front-rear acceleration threshold value β, the minimum rotation number restriction unit 42 sets the minimum necessary rotation number Nb as a minimum rotation number of the pump 4 necessary to secure the flow rate to be discharged from the pump 4 to perform the posture control of the sprung member B to a default value Nb1 greater than zero. For example, a nose dive generated in braking, a squat generated in acceleration, a roll generated in turning, and the like are suppressed by the posture control, so that the extension/contraction amount of the actuator body A becomes insignificant. For this reason, the discharge flow rate of the pump 4 to perform the posture control of the sprung member B may be a small flow rate sufficient to set the pressure required to control the pressure of the supply channel 5 to the minimum. Therefore, the default value Nb1 may be a low rotation number. Furthermore, if the horizontal acceleration Glat of the sprung member B is equal to or lower than the horizontal acceleration threshold value α, and the front-rear direction acceleration Glong of the sprung member B is equal to or lower than the front-rear acceleration threshold value β, the minimum rotation number restriction unit 42 sets the minimum necessary rotation number Nb to zero.

Figure 8:
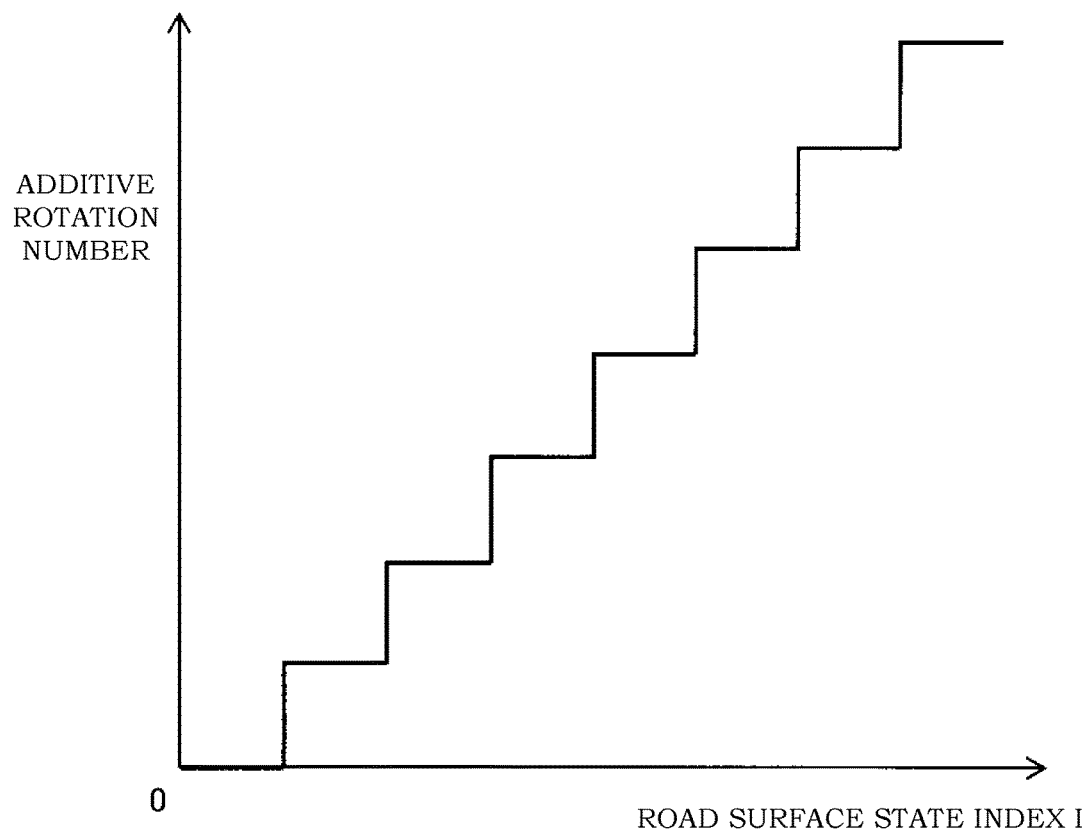
FIG. 8 is a map illustrating a relationship between a road surface state index and an additive rotation number.

The target rotation number determination unit 43 determines the target rotation number Nref of the pump 4 on the basis of the road surface state index I. Specifically, the target rotation number determination unit 43 retains a map representing a relationship between the road surface state index I and the additive rotation number Nr and performs map computation for obtaining the additive rotation number Nr from the road surface state index I input from the road surface state index obtainment unit 41 by referencing this map. In this map, as illustrated in FIG. 8, the relationship is set such that the additive rotation number Nr increases stepwise as the road surface state index I increases. The aforementioned map is just an example. In this map, for example, the road surface state index I and the additive rotation number Nr may be associated such that the additive rotation number Nr increases in proportion to the increase of the road surface state index I.

If the additive rotation number Nr is obtained, the target rotation number determination unit 43 obtains the target rotation number Nref by adding the additive rotation number Nr to the minimum necessary rotation number Nb input separately from the road surface state index I and outputs this target rotation number Nref to the pump stop determination unit 44. If the minimum rotation number restriction unit 42 sets the minimum necessary rotation number Nb to the default value Nb1, the target rotation number determination unit 43 outputs a value obtained by adding the additive rotation number Nr to the default value Nb1. If the minimum rotation number restriction unit 42 sets the minimum necessary rotation number Nb to zero, the target rotation number determination unit 43 adds the additive rotation number Nr to zero. Therefore, the additive rotation number Nr is directly output as the target rotation number Nref.

The road surface state index I is a measure of road surface roughness. If a vehicle travels on a road surface having serious road surface roughness, the extension/contraction amount and the extension/contraction velocity of the actuator body A tend to increase. That is, if the value of the road surface state index I is large, the actuator body A is forcibly extended or contracted by an external force, and the fluid amount necessary in the cylinder 1 also increases. Therefore, it is necessary to increase the rotation number of the pump 4. For this reason, the additive rotation number Nr is associated with the road surface state index I such that the additive rotation number Nr increases as the road surface state index I increases.

If the minimum rotation number restriction unit 42 is omitted, the target rotation number determination unit 43 may not obtain the additive rotation number Nr from the road surface state index I, but may create a map representing a relationship between the road surface state index I and the target rotation number Nref and directly obtain the target rotation number Nref from the road surface state index I. In addition, the target rotation number determination unit 43 uses the map when the additive rotation number Nr or the target rotation number Nref is obtained from the road surface state index I. However, if the additive rotation number Nr or the target rotation number Nref can be obtained by calculating a function having the road surface state index I as a parameter, the additive rotation number Nr or the target rotation number Nref may be obtained without using the map.

If the vehicle speed V is equal to or lower than the speed threshold value $\gamma$, the pump stop determination unit 44 sets the target rotation number Nref of the pump 4 to zero. Specifically, the pump stop determination unit 44 determines whether nor not the vehicle speed V detected by the vehicle speed sensor 47 is equal to or lower than the speed threshold value $\gamma$. If the vehicle speed V is equal to or lower than the speed threshold value $\gamma$, the target rotation number of the pump 4 is set to zero and is output to the driver Dr. If the vehicle speed V is higher than the speed threshold value $\gamma$, the target rotation number Nref output by the target rotation number determination unit 43 is directly output to the driver Dr.

If the vehicle speed V is low, both the extension/contraction amount and the extension/contraction velocity of the actuator body A are small. Even when the pump 4 stops, the vehicle vibration can be sufficiently suppressed by the thrust force generated by the actuator device AD. Therefore, the pump 4 stops by setting the target rotation number Nref to zero. The vehicle speed threshold value $\gamma$ is set to an arbitrary value depending on a vehicle where the suspension device S is mounted.

The driver Dr has a driving circuit for driving the solenoid 20c and 9e of the control valve V and the direction switching valve 9 in a pulse-width modulation (PWM) manner and a driving circuit for driving the motor 13 used to drive the pump 4 in the PWM manner. If the driver Dr receives a command from the thrust force calculation unit 45 to the control valve V and the direction switching valve 9 and a command from the pump stop determination unit 44, an electric current is supplied to the solenoids 20c and 9e, and the motor 13 in response to the command. Note that each driving circuit of the driver Dr may be a driving circuit other than the PWM-based driving circuit.

Figure 9:
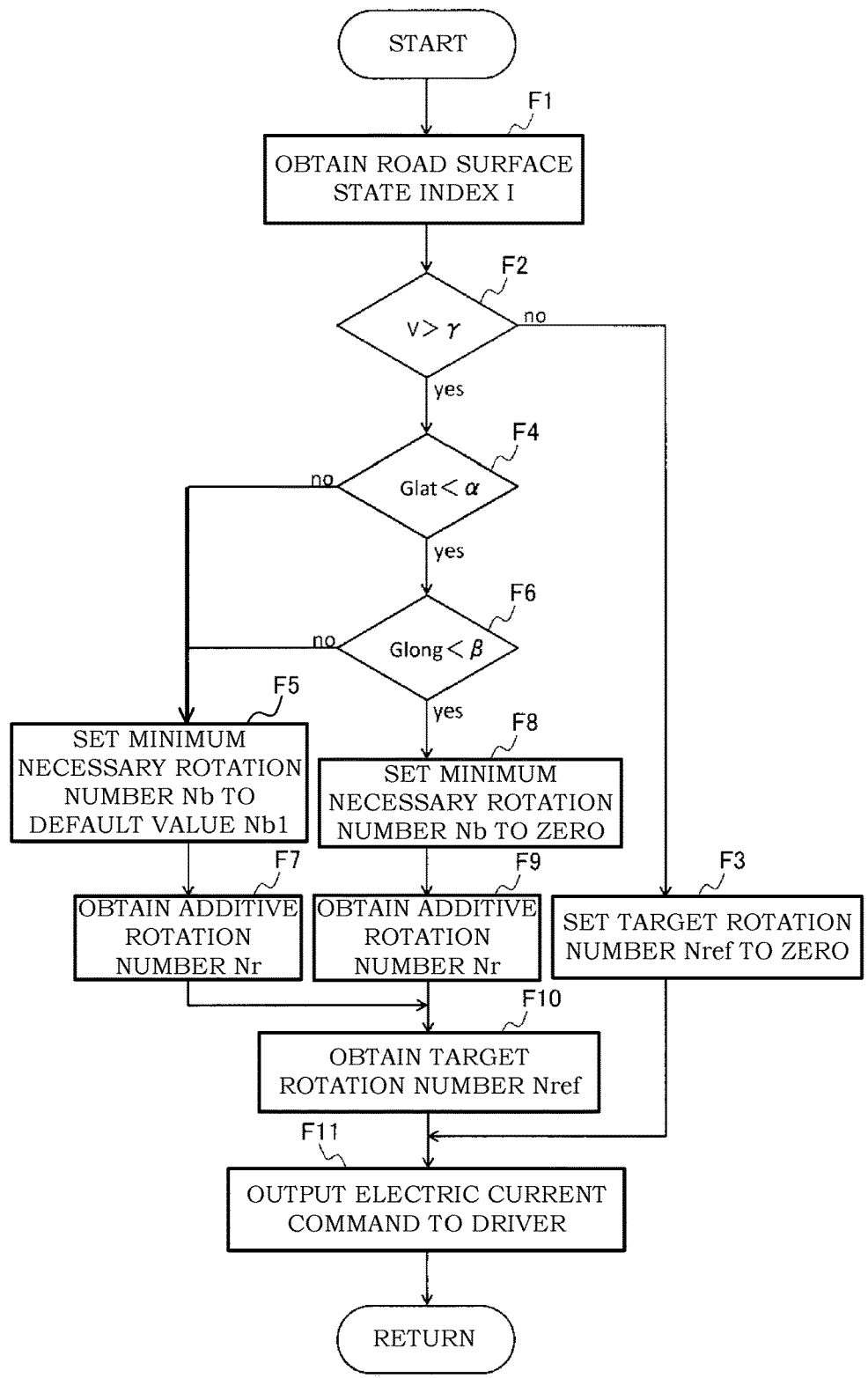
FIG. 9 is a flowchart illustrating a process flow for obtaining a rotation speed of the pump.

Next, a processing flow for obtaining the target rotation number Nref of the pump 4 in the controller C will be described with reference to the exemplary flowchart of FIG. 9.

First, the controller C receives an input of the acceleration of the unsprung member W and obtains the road surface state index I (step F1). Subsequently, the process advances to step F2, where the controller C determines whether or not the vehicle speed V exceeds the vehicle speed threshold value $\gamma$. If the vehicle speed V is equal to or lower than the vehicle speed threshold value $\gamma$, the process advances to step F3. If the vehicle speed V exceeds the vehicle speed threshold value $\gamma$, the process advances to step F4.

In step F3, the vehicle speed V is equal to or lower than the vehicle speed threshold value $\gamma$. Therefore, the controller C sets the target rotation number Nref to zero, and the process advances to step F11. Meanwhile, in step F4, the controller C determines whether or not the horizontal acceleration Glat exceeds the horizontal acceleration threshold value $\alpha$. If the horizontal acceleration Glat exceeds the horizontal acceleration threshold value $\alpha$, the process advances to step F5. If the horizontal acceleration Glat is equal to or lower than the horizontal acceleration threshold value $\alpha$, the process advances to step F6.

In step F6, the controller C determines whether or not the front-rear direction acceleration Glong exceeds the front-rear acceleration threshold value $\beta$. If the front-rear direction acceleration Glong exceeds the front-rear acceleration threshold value $\beta$, the process advances to step F5. If the front-rear direction acceleration Glong is equal to or lower than the front-rear acceleration threshold value $\beta$, the process advances to step F8.

In step F5, the controller C sets the minimum necessary rotation number Nb to the default value Nb1, and the process advances to step F7. In step F7, the controller C obtains the additive rotation number Nr from the road surface state index I, and the process advances to step F10.

In step F8, the controller C sets the minimum necessary rotation number Nb to zero, and the process advances to step F9. In step F9, the controller C obtains the additive rotation number Nr from the road surface state index I, and the process advances to step F10.

In step F10, the controller C adds the additive rotation number Nr to the minimum necessary rotation number Nb to obtain the target rotation number Nref, and the process advances to step F11. In step F11, the controller C outputs the electric current command to the motor 13 in order to rotationally drive the pump 4 at the target rotation number Nref. The controller C repeatedly executes the aforementioned processing flows to control the pump 4 by repeatedly obtaining the target rotation number Nref of the pump 4.

In the suspension device S according to this embodiment operated as described above, the target rotation number Nref is obtained on the basis of the road surface state index I. The road surface state index I is a measure of road surface roughness, and the extension/contraction amount and the extension/contraction velocity of the actuator body A tend to increase as the road surface becomes rough. That is, if the road surface state index I has a large value, the actuator body A is forcibly extended or contracted by an external force, and the fluid amount necessary in the cylinder 1 increases. In the suspension device S according to this embodiment, if the road surface state index I is large, the target rotation number Nref is set to a high value, so that fluid supply shortage is not easily generated in the cylinder 1. Meanwhile, if the road surface state index I has a small value, the target rotation number Nref is set to a small value, so that the rotation speed of the pump 4 is reduced. For this reason, it is possible to reduce power consumption in the suspension device S.

In this manner, in the suspension device S according to this embodiment, the pump 4 is not driven at a constant rotation speed. It is possible to reduce energy consumption by reducing the rotation speed of the pump 4 when a vehicle travels on a smooth road surface where the discharge flow rate may be small.

By using the controller C as the suspension control unit, it is possible to reduce power consumption in the pump 4. In the suspension device S and the suspension control unit, the pump 4 is not driven at a constant rotation speed at all times, and the energy consumption to drive the pump 4 can be reduced. Therefore, it is possible to apply the suspension device S to a vehicle such as an HEV or EV.

In the suspension device S according to this embodiment, if the vehicle speed V is equal to or lower than the speed threshold value γ, the target rotation number of the pump 4 is set to zero. In this manner, when there is no need to supply the flow rate from the pump 4 in the actuator device AD, the pump 4 stops. Therefore, compared to the suspension device of the prior art in which the pump is driven at a constant rotation speed at all times, it is possible to remarkably reduce energy consumption.

Furthermore, in the suspension device S according to this embodiment, if the horizontal acceleration Glat is equal to or lower than the horizontal acceleration threshold value α, and the front-rear direction acceleration Glong is equal to or lower than the front-rear acceleration threshold value β, the minimum necessary rotation number Nb of the pump 4 is set to zero. In this manner, if it is predicted that the flow rate from the pump 4 necessary in the actuator device AD is low, the target rotation number Nref of the pump 4 is set to a significantly low rotation number. Therefore, it is possible to more effectively reduce the energy consumption.

The actuator device AD includes an actuator body A provided with a cylinder 1 and a piston 2 movably inserted into the cylinder 1 to partition the cylinder 1 into the extension-side chamber R1 and the contraction-side chamber R2, the pump 4, the reservoir R connected to the suction side of the pump 4, the actuator body A and the pump 4 and the reservoir R, the supply channel 5 connected to the discharge side of the pump 4, the discharge channel 6 connected to the reservoir R, the extension-side passage 7 connected to the extension-side chamber R1, the contraction-side passage 8 connected to the contraction-side chamber R2, the direction switching valve 9 as a switching unit for selectively connecting one of the extension-side passage 7 and the contraction-side passage 8 to the supply channel 5 and connecting the other one of the extension-side passage 7 and the contraction-side passage 8 to the discharge channel 6, the extension-side damping element VE provided in the extension-side passage 7 to apply resistance to a flow directed from the extension-side chamber R1 to the direction switching valve 9 and allows the opposite flow, the contraction-side damping element VC provided in the contraction-side passage 8 to apply resistance to a flow directed from the contraction-side chamber R2 to the direction switching valve 9 and allows the opposite flow, the control valve V capable of adjusting the pressure of the supply channel 5 depending on a supplied electric current, the suction passage 10 that connects the supply channel 5 and the discharge channel 6, the suction check valve 11 provided in the middle of the suction passage 10 to allow only a flow of the fluid directed from the discharge channel 6 to the supply channel 5, and the supply-side check valve 12 provided between the control valve V and the pump 4 in the middle of the supply channel 5 to allow only a flow directed from the pump 4 side to the control valve V side. Since the actuator device AD has such a configuration, the actuator device AD automatically serves as a semi-active suspension if the flow rate necessary in the cylinder 1 exceeds the discharge flow rate of the pump 4. Therefore, it is possible to guarantee a vehicle ride quality. For this reason, it is possible to suppress the discharge flow rate of the pump 4 to a small value and implement an active suspension using a small output power motor 13.

In this manner, in the suspension device S according to this embodiment, it is possible to miniaturize the motor 13 that drives the pump 4 and thus improve mountability to a vehicle such as an HEV or EV. The configuration of the actuator device AD is not limited to the aforementioned configuration. Any configuration may be employed as long as the energy consumption in the pump 4 can be reduced by obtaining the target rotation number Nref of the pump 4 on the basis of the road surface state index I.

Note that, if the control valve V has a low pressure override characteristic against the flow rate, the pressure applied to the pump 4 is reduced, and the energy amount consumed by the pump 4 is accordingly reduced. Therefore, it is possible to suppress energy consumption of the pump 4.

In the suspension device S, only two electromagnetic valves having the solenoid are provided, including the direction switching valve 9 and the control valve V. Therefore, compared to the suspension device of the prior art, it is possible to reduce the number of the electromagnetic valves and the system cost. In this manner, although a small number of electromagnetic valves having the solenoid are provided, the suspension device S can exhibit a fail-safe operation in the event of a failure as well as serve as an active suspension. In addition, the driver Dr for driving the direction switching valve 9 and the control valve V may have a driving circuit for driving only two solenoids 9e and 20c. Therefore, compared to the suspension device of the prior art in which three or more electromagnetic valves are necessary, a smaller number of driving circuits may be provided in the driver Dr. Therefore, it is possible to reduce the cost for the driver Dr that drives the suspension device S.

In the suspension device S according to this embodiment, the extension-side damping element VE has an extension-side damping valve 15 that applies resistance to a flow directed from the extension-side chamber R1 to the direction switching valve 9, and the extension-side check valve 16 provided in parallel with the extension-side damping valve 15 to allow only a flow directed from the direction switching valve 9 to the extension-side chamber R1. In addition, the contraction-side damping element VC has a contraction-side damping valve 17 that applies resistance to a flow directed from the contraction-side chamber R2 to the direction switching valve 9, and a contraction-side check valve 18 provided in parallel with the contraction-side damping valve 17 to allow only a flow directed from the direction switching valve 9 to the contraction-side chamber R2. Therefore, when the fluid is supplied from the pump 4 to the extension-side chamber R1 or the contraction-side chamber R2, it is possible to supply the fluid to the extension-side chamber R1 or the contraction-side chamber R2 with nearly no resistance using the extension-side check valve 16 or the contraction-side check valve 18. In addition, it is possible to reduce a load of the pump 4 when the extending/contracting direction of the actuator body A matches the direction of the generated thrust force. In addition, if the fluid is discharged from the extension-side chamber R1 or the contraction-side chamber R2, the extension-side damping valve 15 or the contraction-side damping valve 17 applies resistance to the passing fluid. Therefore, it is possible to obtain a large thrust force by setting the pressure of the extension-side chamber R1 or the contraction-side chamber R2 to be equal to or higher than the valve open pressure of the control valve V. Accordingly, even when the thrust force of the solenoid 20c of the control valve V is reduced, it is possible to generate a large thrust force in the suspension device S. In this regard, it is possible to miniaturize the control valve V and reduce the cost. Note that the extension-side damping element VE and the contraction-side damping element VC may apply resistance to the flow of the fluid regardless of the fluid flow direction. The extension-side check valve 16 and the contraction-side check valve 18 may be omitted as long as the extension-side damping valve 15 and the contraction-side damping valve 17 allow a bidirectional flow.

Figure 10:
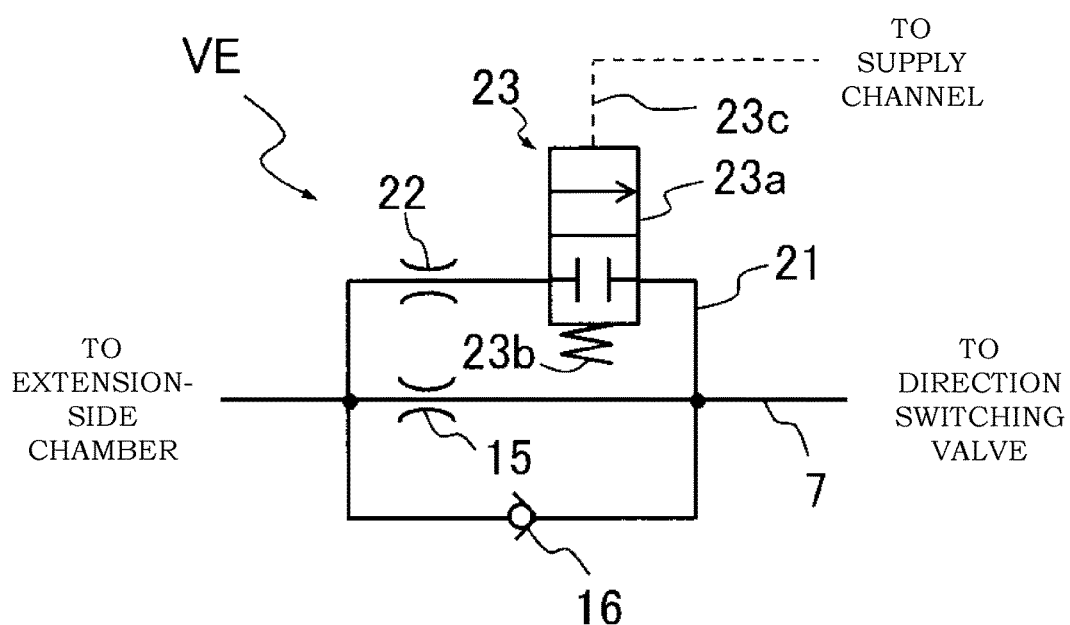
FIG. 10 is a diagram illustrating a modification of the extension-side damping element.

As illustrated in FIG. 10, the extension-side damping element VE may include, in addition to the extension-side damping valve 15 and the extension-side check valve 16, an expansion-side bypass passage 21 provided in parallel with the extension-side damping valve 15, and a second extension-side damping valve 22 and an extension-side on-off valve 23 provided in the expansion-side bypass passage 21. The extension-side on-off valve 23 includes a valve body 23a that opens or closes the expansion-side bypass passage 21, a spring 23b that biases the valve body 23a toward the valve close direction, and a pilot passage 23c that introduces the pressure of the supply channel 5 as a pilot pressure to bias the valve body 23a to the valve open direction.

The second extension-side damping valve 22 may be a damping valve that allows a flow of the fluid bidirectionally flowing an expansion-side bypass passage 21 or may be a damping valve that allows only a flow of the fluid discharged from the extension-side chamber R1.

If the pressure of the supply channel 5 is equal to or higher than a predetermined value, the extension-side on-off valve 23 opens the expansion-side bypass passage 21 as the valve body 23a is biased by virtue of the pilot pressure to shrink the spring 23b. If the pressure of the supply channel 5 is lower than the predetermined value, the valve body 23a is closed by virtue of the biasing force of the spring 23b, and the expansion-side bypass passage 21 is blocked.

The predetermined value used to determine whether the extension-side on-off valve 23 is opened or closed is set to a value equal to the pressure of the reservoir R or a value slightly higher than the pressure of the reservoir R, for example, a minimum valve open pressure of the control valve V. In the event of a failure, the pressure of the supply channel 5 becomes nearly equal to the pressure of the reservoir R. In this case, the pilot pressure becomes lower than the predetermined value, so that the valve body 23a is biased by the spring 23b, and the expansion-side bypass passage 21 is blocked. Meanwhile, if the fluid is discharged from the extension-side chamber R1 by driving the pump 4, the pressure of the supply channel 5 becomes higher than the pressure of the reservoir R. Therefore, the extension-side on-off valve 23 is opened, and the expansion-side bypass passage 21 is opened.

Therefore, in the event of a failure, the extension-side on-off valve 23 is closed, and only the extension-side damping valve 15 becomes valid. In addition, when the extension-side on-off valve 23 is opened, and the fluid is discharged from the extension-side chamber R1 by driving the pump 4, the second extension-side damping valve 22 as well as the extension-side damping valve 15 becomes also valid. That is, while the control is normally performed by driving the pump 4, the fluid is easily discharged from the extension-side chamber R1 in the extension stroke of the damper D. Therefore, in the suspension device S having the extension-side damping element VE provided with the expansion-side bypass passage 21, the second extension-side damping valve 22, and the extension-side on-off valve 23 in addition to the extension-side damping valve 15 and the extension-side check valve 16, it is possible to increase the damping force of the extension stroke of the damper D in the event of a failure. As a result, even in the event of a failure, no deficiency occurs in the damping force, and it is possible to reliably control a vibration in the chassis B and the vehicle wheel W.

Figure 11:
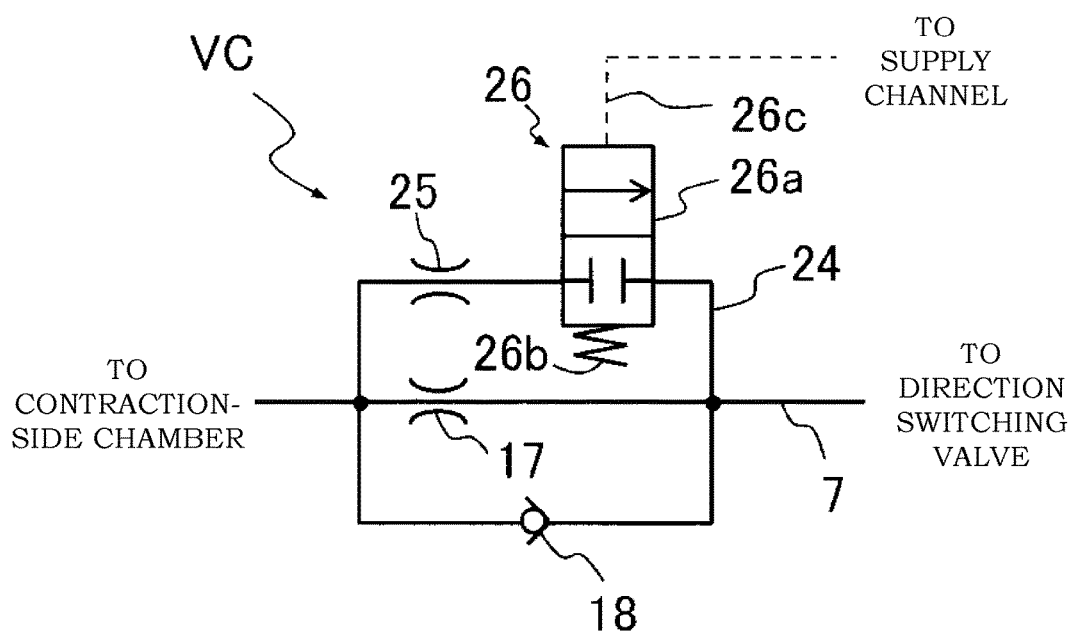
FIG. 11 is a diagram illustrating a modification of the contraction-side damping element.

Similarly, as illustrated in FIG. 11, the contraction-side damping element VC has, in addition to the contraction-side damping valve 17 and the contraction-side check valve 18, a contraction-side bypass passage 24 provided in parallel with the contraction-side damping valve 17, a second contraction-side damping valve 25 provided in the contraction-side bypass passage 24, and a contraction-side on-off valve 26. The contraction-side on-off valve 26 has a valve body 26a that opens or closes the contraction-side bypass passage 24, a spring 26b that biases the valve body 26a in the valve close direction, and a pilot passage 26c that introduces the pressure of the supply channel 5 as a pilot pressure to bias the valve body 26a in the valve open direction.

The second contraction-side damping valve 25 may be a damping valve that allows a flow of the fluid bidirectionally flowing the contraction-side bypass passage 24 or may be a damping valve that allows only a flow of the fluid discharged from the contraction-side chamber R2.

If the pressure of the supply channel 5 is equal to or higher than a predetermined value, the contraction-side on-off valve 26 opens the contraction-side bypass passage 24 as the valve body 26a is biased by virtue of the pilot pressure to shrink the spring 26b. If the pressure of the supply channel 5 is lower than the predetermined value, the valve body 26a is closed by virtue of the biasing force of the spring 26b, and the contraction-side bypass passage 24 is blocked.

The predetermined value used to determine whether the contraction-side on-off valve 26 is opened or closed is set to a value equal to the pressure of the reservoir R or a value slightly higher than the pressure of the reservoir R, for example, a minimum valve open pressure of the control valve V. In the event of a failure, the pressure of the supply channel 5 becomes nearly equal to the pressure of the reservoir R. In this case, the pilot pressure becomes lower than the predetermined value, so that the valve body 26a is biased by the spring 26b, and the contraction-side bypass passage 24 is blocked. Meanwhile, if the fluid is discharged from the contraction-side chamber R2 by driving the pump 4, the pressure of the supply channel 5 becomes higher than the pressure of the reservoir R. Therefore, the contraction-side on-off valve 26 is opened, and the contraction-side bypass passage 24 is opened.

Therefore, in the event of a failure, the contraction-side on-off valve 26 is closed, and only the contraction-side damping valve 17 becomes valid. In addition, when the contraction-side on-off valve 26 is opened, and the fluid is discharged from the contraction-side chamber R2 by driving the pump 4, the second contraction-side damping valve 25 as well as the contraction-side damping valve 17 becomes also valid. That is, while the control is normally performed by driving the pump 4, the fluid is easily discharged from the contraction-side chamber R2 in the contraction stroke of the damper D. Therefore, in the suspension device S having the contraction-side damping element VC provided with the contraction-side bypass passage 24, the second contraction-side damping valve 25, and the contraction-side on-off valve 26 in addition to the contraction-side damping valve 17 and the contraction-side check valve 18, it is possible to increase the damping force of the contraction stroke of the damper D in the event of a failure. As a result, even in the event of a failure, no deficiency occurs in the damping force, and it is possible to reliably control a vibration in the chassis B and the vehicle wheel W.

The contraction-side damping element VC having, in addition to the contraction-side damping valve 17 and the contraction-side check valve 18, the contraction-side bypass passage 24, the second contraction-side damping valve 25, and the contraction-side on-off valve 26 may also be applied to the suspension device S provided with the extension-side damping element VE having, in addition to the extension-side damping valve 15 and the extension-side check valve 16, the expansion-side bypass passage 21, the second extension-side damping valve 22, and the extension-side on-off valve 23.

Figure 12:
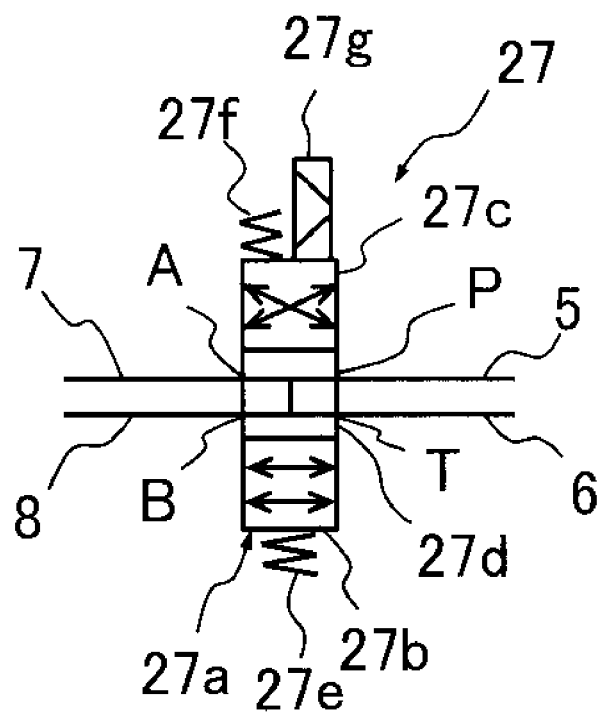
FIG. 12 is a diagram illustrating a modification of the switching unit.

Furthermore, instead of the direction switching valve 9 provided with two positions including the extension-side supply position 9b and the contraction-side supply position 9c, the switching unit may be a direction switching valve 27 having, as illustrated in FIG. 12, an extension-side supply position 27b in which the supply channel 5 and the extension-side passage 7 are connected, and the discharge channel 6 and the contraction-side passage 8 are connected, a contraction-side supply position 27c in which the supply channel 5 and the contraction-side passage 8 are connected, and the discharge channel 6 and the extension-side passage 7 are connected, and a communication position 27d in which all of the supply channel 5, the discharge channel 6, the extension-side passage 7, and the contraction-side passage 8 communicate with each other.

The direction switching valve 27 is a 4-port 3-position electromagnetic switching valve and includes a valve body 27a having an extension-side supply position 27b in which the ports A and P communicate with each other, and the ports B and T communicate with each other, a contraction-side supply position 27c in which the ports A and T communicate with each other, and the ports B and P communicate with each other, and a communication position 27d in which all of the ports A, B, P, and T communicate with each other, springs 27e and 27f that bias the valve body 27a to position the valve body 27a in the communication position 27d, and a push-pull solenoid 27g that drives the valve body 27a to any one of the extension-side supply position 27b or the contraction-side supply position 27c against the springs 27e and 27f. In the event of a non-conduction state in which no electric power is supplied to the solenoid 27g, the valve body 27a is biased by the springs 27e and 27f to have the communication position 27d. If an electric current flows to the push-pull solenoid 27g, the valve body 27a is pressed by the thrust force from the push-pull solenoid 27g and is selectively switched to the extension-side supply position 27b or the contraction-side supply position 27c.

Therefore, if the direction switching valve 27 takes the extension-side supply position 27b, the pump 4 communicates with the extension-side chamber R1, so that the damper D can be actively contracted. In addition, if the direction switching valve 27 takes the contraction-side supply position 27c, the pump 4 communicates with the contraction-side chamber R2, so that the damper D can be actively extended similarly to the direction switching valve 9 described above. If the direction switching valve 27 takes the communication position 27d, the extension-side chamber R1 and the contraction-side chamber R2 directly communicate with each other through the direction switching valve 27. Similar to the suspension device S provided with the direction switching valve 9 described above, by setting the communication position 27d in the event of a failure, it is possible to exert the damping force using the extension-side damping element VE and the contraction-side damping element VC and reliably perform the fail-safe operation.

The push-pull solenoid 27g has two solenoids. If there are two solenoids, and the electric current flows to one of the solenoids, a movable iron core is displaced in an axial direction inside the other solenoid. Therefore, by detecting a change of the inductance of the other coil, or the like, a position of the movable iron core can be recognized. Therefore, without providing a sensor for detecting the operation of the valve body 27a, it is possible to detect the position of the valve body 27a and monitor whether or not the direction switching valve 27 is normally operated.

Figure 13:
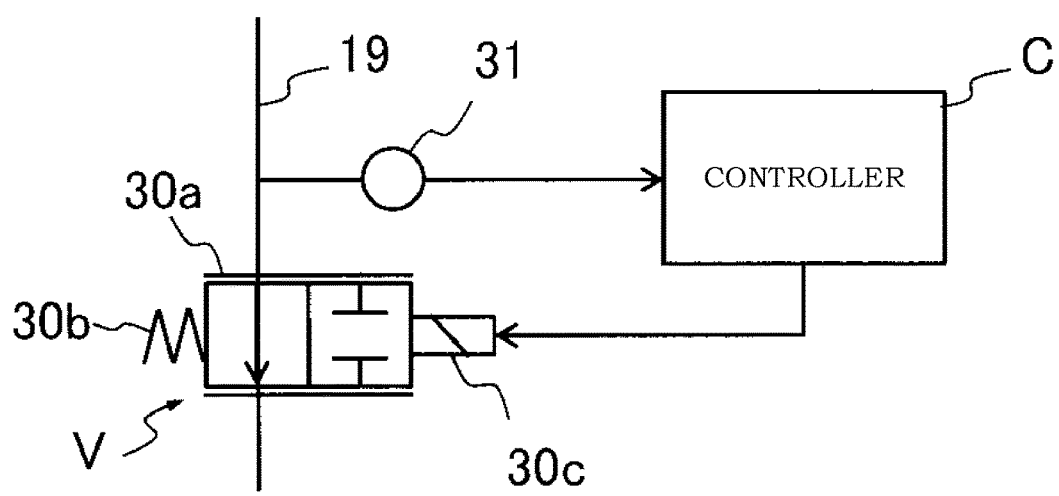
FIG. 13 is a diagram illustrating a modification of the control valve.

Without limiting to the pressure control valve, the control valve V may be an electromagnetic throttle valve as illustrated in FIG. 13. The control valve V has a valve body 30a provided in the middle of the control passage 19, a spring 30b that biases the valve body 30a in the valve open direction, and a solenoid 30c capable of generating a thrust force for biasing the valve body 30a in the valve close direction against the spring 30b. A pressure sensor 31 for detecting the pressure of the supply channel 5 is employed to control the pressure of the supply channel 5 using this control valve V. For example, the pressure of the supply channel 5 is detected using the pressure sensor 31, and the detected pressure is fed back, so that a target current supplied to the solenoid 30c is obtained from a difference between the target pressure obtained by the controller C and the detected pressure. The controller C obtains the pressure of the supply channel 5 from the target thrust force generated in the damper D. By using the target current obtained in the controller C as a command, the driver device Dr supplies the target current to the solenoid 30c. As a result, a valve opening level of the control valve V is controlled, so that the pressure of the supply channel 5 is controlled to the target pressure, and the thrust force of the damper D is also controlled to the target value. By controlling the control valve V in this manner, the pressure of the supply channel 5 is detected by the pressure sensor 31, so that it is possible to monitor whether or not the hydraulic circuit FC is normally operated. Note that various types of valves may be employed as the control valve V as long as the pressure of the supply channel 5 can be controlled in response to a supplied electric current.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2014-226736 filed with the Japan Patent Office on Nov. 7, 2014, the entire contents of which are incorporated into this specification.

The invention claimed is:

1. A suspension device comprising:
an actuator device that includes an extensible and contractible actuator body interposed between a sprung member and an unsprung member of a vehicle, and a pump configured to supply a fluid to the actuator body to extend or contract the actuator body; and
a controller configured to control a rotation number of the pump, wherein
the controller includes:
a road surface state index obtainment unit configured to obtain a road surface state index as a measure of road surface roughness during a vehicle travel;
a target rotation number determination unit configured to determine a target rotation number of the pump on the basis of the road surface state index; and
a pump stop determination unit configured to set the target rotation number of the pump to zero when a speed of the vehicle is equal to or lower than a speed threshold value.

2. A suspension device, comprising
an actuator device that includes an extensible and contractible actuator body interposed between a sprung member and an unsprung member of a vehicle, and a pump configured to supply a fluid to the actuator body to extend or contract the actuator body; and
a controller configured to control a rotation number of the pump, wherein
the controller includes:
a road surface state index obtainment unit configured to obtain a road surface state index as a measure of road surface roughness during a vehicle travel;
a target rotation number determination unit configured to determine a target rotation number of the pump on the basis of the road surface state index; and
a minimum rotation number restriction unit configured to set a minimum necessary rotation number of the pump to a default value greater than zero when a horizontal acceleration of the sprung member of the vehicle exceeds a horizontal acceleration threshold value, or a front-rear direction acceleration of the sprung member of the vehicle exceeds a front-rear acceleration threshold value, wherein
the target rotation number determination unit obtains the target rotation number by adding an additive rotation number obtained on the basis of the road surface state index to the minimum necessary rotation number.

3. The suspension device according to claim 2, wherein the minimum rotation number restriction unit sets the minimum necessary rotation number of the pump to zero when the horizontal acceleration of the chassis of the vehicle is equal to or lower than the horizontal acceleration threshold value, and the front-rear direction acceleration of the chassis of the vehicle is equal to or lower than the front-rear acceleration threshold value.

4. The suspension device according to claim 1, wherein the controller further includes:
a minimum rotation number restriction unit configured to obtain a minimum necessary rotation number of the pump when a horizontal acceleration of a chassis of the vehicle exceeds a horizontal acceleration threshold value, or a front-rear direction acceleration of the chassis of the vehicle exceeds a front-rear acceleration threshold value;
the target rotation number determination unit configured to obtain the target rotation number by adding an additive rotation number obtained on the basis of the road surface state index to the minimum necessary rotation number; and
a pump stop determination unit configured to set the target rotation number to zero regardless of the target rotation number obtained by the target rotation number determination unit when a speed of the vehicle is equal to or lower than a speed threshold value.

5. The suspension device according to claim 1, wherein the target rotation number determined by the target rotation number determination unit increases stepwise as the road surface state index increases.

6. The suspension device according to claim 1, wherein the road surface state index obtainment unit obtains the road surface state index on the basis of at least one of an integral value of an absolute value, an integration average of the absolute value, a root-mean-square value, a simple average, a maximum value, and a frequency distribution of any one of state quantities including an acceleration, a velocity, or a displacement of the unsprung member within a predetermined time and a relative acceleration, a relative velocity, or a relative displacement between the unsprung member and the sprung member within a predetermined time.

7. The suspension device according to claim 1, wherein the actuator body provided with a cylinder and a piston movably inserted into the cylinder to partition the cylinder into an extension-side chamber and a contraction-side chamber, and
wherein the actuator device further includes:
the pump;
a reservoir connected to a suction side of the pump;
a supply channel connected to an discharge side of the pump;
a discharge channel connected to the reservoir;
an extension-side passage connected to the extension-side chamber;
a contraction-side passage connected to the contraction-side chamber;
a switching unit that selectively connects one of the extension-side passage and the contraction-side passage to the supply channel and connects the other one of the extension-side passage and the contraction-side passage to the discharge channel;
an extension-side damping element provided in the extension-side passage to apply resistance to a flow directed from the extension-side chamber to the switching unit and allows a flow of the opposite direction;
a contraction-side damping element provided in the contraction-side passage to apply resistance to a flow directed from the contraction-side chamber to the switching unit and allows a flow of the opposite direction;
a control valve configured to control a pressure of the supply channel depending on a supplied electric current;
a suction passage that connects the supply channel and the discharge channel;
a suction check valve provided in the middle of the suction passage to allow only a flow of fluid directed from the discharge channel to the supply channel; and a supply-side check valve provided between the control valve and the pump in the middle of the supply channel to allow only a flow directed from the pump side to the control valve side.

8. A suspension control unit for controlling a rotation number of a pump in an actuator device having an extensible and contractible actuator body interposed between a sprung member and an unsprung member of a vehicle and the pump configured to supply a fluid to the actuator body to extend or contract the actuator body, the suspension control unit comprising:
- a road surface state index obtainment unit configured to obtain a road surface state index as a measure of road surface roughness during a vehicle travel;
- a target rotation number determination unit configured to determine a target rotation number of the pump on the basis of the road surface state index; and
- a pump stop determination unit configured to set the target rotation number of the pump to zero when a speed of the vehicle is equal to or lower than a speed threshold value.

* * * * *